US011496651B2

(12) United States Patent
Nishio

(10) Patent No.: US 11,496,651 B2
(45) Date of Patent: Nov. 8, 2022

(54) PRINT METHOD

(71) Applicant: MIMAKI ENGINEERING CO., LTD., Nagano (JP)

(72) Inventor: Keita Nishio, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 17/553,677

(22) Filed: Dec. 16, 2021

(65) Prior Publication Data

US 2022/0201160 A1  Jun. 23, 2022

(30) Foreign Application Priority Data

Dec. 17, 2020  (JP) .............................. JP2020-209258

(51) Int. Cl.
*H04N 1/60* (2006.01)
*B41J 2/21* (2006.01)

(52) U.S. Cl.
CPC .............. *H04N 1/6027* (2013.01); *B41J 2/21* (2013.01); *H04N 1/605* (2013.01); *H04N 1/6072* (2013.01)

(58) Field of Classification Search
CPC ..... H04N 1/6027; H04N 1/605; H04N 1/6072
See application file for complete search history.

(56) References Cited

U.S. PATENT DOCUMENTS

| 5,668,890 | A | * | 9/1997 | Winkelman | ......... H04N 1/4074 358/521 |
| 7,046,398 | B2 | * | 5/2006 | Tullis | ................... H04N 1/4078 382/172 |
| 2005/0052665 | A1 | * | 3/2005 | Moroney | ................... G06T 5/40 358/1.9 |
| 2013/0088538 | A1 | * | 4/2013 | Izoe | ......................... H04N 1/60 347/9 |
| 2022/0201160 | A1 | * | 6/2022 | Nishio | ................... H04N 1/605 |

FOREIGN PATENT DOCUMENTS

| JP | 2016043618 | | 4/2016 | |
| JP | 2016043618 | A * | 4/2016 | .......... B29C 64/112 |
| JP | 6338194 | | 6/2018 | |
| JP | 6338194 | B2 * | 6/2018 | ............. G06T 5/009 |
| JP | 2019012378 | | 1/2019 | |

* cited by examiner

*Primary Examiner* — Ted W Barnes
(74) *Attorney, Agent, or Firm* — JCIPRNET

(57) ABSTRACT

In this print method, assuming that the number of stacking of ink layers in a thickest portion in a thickly-piled portion is N, in a histogram preparation step ST2, a histogram of luminance values of grayscale image data prepared in an image data preparation step ST1 is prepared, and in luminance value range setting steps ST3 to ST10, a luminance value of predetermined gradations of the histogram is divided into N and N luminance value ranges are set. In the luminance value range setting steps ST3 to ST10, a division position of the luminance value of the predetermined gradations is adjusted while the histogram displayed on a predetermined display is checked.

12 Claims, 16 Drawing Sheets

PRINT METHOD

CROSS REFERENCE TO RELATED APPLICATIONS

This application claims the priority benefit of Japanese Patent Application No. 2020-209258, filed on Dec. 17, 2020. The entirety of the above-mentioned patent application is hereby incorporated by reference herein and made a part of this specification.

TECHNICAL FIELD

The present disclosure relates to a print method for printing an uneven portion having unevenness on a surface on a print medium.

DESCRIPTION OF THE BACKGROUND ART

Conventionally, there is known a printing and object-shaping system that performs a 2.5-dimensional operation between printing of a two-dimensional image and shaping of a three-dimensional object to print an unevenness shape having unevenness on a surface on a print medium (see, for example, Japanese Unexamined Patent Publication No. 2016-43618 (Patent Literature 1)). The printing and object-shaping system described in Japanese Unexamined Patent Publication No. 2016-43618 includes an inkjet head that ejects an ultraviolet-curable ink, and an ultraviolet light source that irradiates the ink ejected on a print medium with ultraviolet light. In this printing and object-shaping system, an ink layer formed by an ink ejected from an inkjet head and cured by ultraviolet light applied from an ultraviolet light source is sequentially stacked on a print medium to print an unevenness shape on the print medium.

In addition, conventionally, an embossing simulation apparatus that simulates an unevenness shape of a face material surface of an embossed wallpaper or leather is known (see, for example, Japanese Unexamined Patent Publication No. 2019-12378 (Patent Literature 2)). In the simulation apparatus described in Japanese Unexamined Patent Publication No. 2019-12378, in the simulation information table stored in the storage portion, the height of the unevenness shape on the face material surface of wallpaper, leather, or the like is represented in 8-bit (256 gradations) grayscale. Furthermore, conventionally, an image data conversion apparatus that converts color image data into black-and-white image data by gray-scaling is known (see, for example, Japanese Patent No. 6338194 (Patent Literature 3)). The image data conversion apparatus described in Japanese Patent No. 6338194 gray-scales color image data, prepares a histogram of luminance values for the gray-scaled image data, and executes predetermined processing based on the prepared histogram.

[Patent Literature 1]: Japanese Unexamined Patent Publication No. 2016-43618

[Patent Literature 2]: Japanese Unexamined Patent Publication No. 2019-12378

[Patent Literature 3]: Japanese Patent No. 6338194

SUMMARY

The inventor of the present application has studied a method for printing an uneven portion including a plurality of stacked ink layers and having unevenness on the surface on a print medium by an inkjet printer. For example, the inventor of the present application has studied the following print method as a method for printing a woodgrain uneven portion on the entire print medium (see FIG. 4), or printing an uneven portion made of a picture of tigers on a part of the print medium (see FIG. 5).

That is, when in the uneven portion 3, a portion that gives thickness to the uneven portion 3 is defined as the thickly-piled portion 3a, and the thickest portion in the thickly-piled portion 3a includes, for example, 10-layer-stacked ink layers (see FIGS. 8B and 18B), first, grayscale image data is prepared being image data including the uneven portion 3 to be printed on the print medium 2 and being image data in which the thickness of the thickly-piled portion 3a is represented by, for example, 256 gradations (8 bits) of grayscale. For example, the grayscale image data shown in FIG. 4 and the grayscale image data shown in FIG. 5 are prepared. In this case, for example, an operator prepares grayscale image data using a personal computer (PC) in which image preparation software is installed. In the grayscale image data shown in FIGS. 4 and 5, the density of the image increases as the thickness of the thickly-piled portion 3a increases.

Thereafter, a histogram of luminance values of the prepared grayscale image data is automatically prepared on the PC. That is, a histogram of the luminance values of the grayscale image data with the luminance value of 256 gradations (0 to 255) on the horizontal axis and the number of pixels on the vertical axis is prepared on the PC. The histogram shown in FIG. 6 is a histogram of luminance values of the grayscale image data shown in FIG. 4, and the histogram shown in FIG. 17 is a histogram of luminance values of the grayscale image data shown in FIG. 5. In the histograms shown in FIGS. 6 and 17, the luminance value increases as the density of the image increases.

Thereafter, the luminance values of 256 gradations of the created histogram are equally divided into 10, and a range of 10 luminance values (luminance value range) is set. That is, the luminance value of 256 gradations of the histogram is equally divided into 10 being is the same number as the number of stacking of the ink layers of the thickest portion in the thickly-piled portion 3a, and 10 luminance value ranges are set. Specifically, luminance values of 256 gradations of the histogram are equally divided into 10, and as shown in FIGS. 6 and 17, a first luminance value range R1 in which the luminance value is 255 or less and 229.5 or more, a second luminance value range R2 in which the luminance value is less than 229.5 and 204 or more, a third luminance value range R3 in which the luminance value is less than 204 and 178.5 or more, a fourth luminance value range R4 in which the luminance value is less than 178.5 and 153 or more, a fifth luminance value range R5 in which the luminance value is less than 153 and 127.5 or more, a sixth luminance value range R6 in which the luminance value is less than 127.5 and 102 or more, a seventh luminance value range R7 in which the luminance value is less than 102 and 76.5 or more, an eighth luminance value range R8 in which the luminance value is less than 76.5 and 51 or more, a ninth luminance value range R9 in which the luminance value is less than 51 and 25.5 or more, and a tenth luminance value range R10 in which the luminance value is less than 25.5 and exceeds 0 are set.

Thereafter, printing is performed on the print medium 2 based on the set luminance value range. When printing is performed on the print medium 2, for example, first, a color ink layer 3b made of the cured color ink is formed, and a thickly-piled portion 3a made of the cured clear ink is formed thereon (see FIGS. 8B and 18B). Since the color ink layer 3b is composed of one ink layer, printing of the ink layer is performed once when the color ink layer 3b is formed. In addition, as described above, since the thickest portion in the thickly-piled portion 3a is composed of 10 ink layers, printing of the ink layer is performed 10 times when the thickly-piled portion 3a is formed.

When the thickly-piled portion 3a is formed, in the portion in which the luminance value is included in the first luminance value range R1 in the grayscale image data, ink layers of 10 layers are printed from the first printing of the ink layer to the tenth printing of the ink layer, and the printed ink layers of 10 layers are sequentially stacked (see hatched portions in FIGS. 8A, 8B, 18A, and 18B). In addition, when the thickly-piled portion 3a is formed, in the portion in which the luminance value is included in the second luminance value range R2 in the grayscale image data, ink layers of 9 layers are printed from the second printing of the ink layer to the tenth printing of the ink layer, and the printed ink layers of 9 layers are sequentially stacked, in the portion in which the luminance value is included in the third luminance value range R3 in the grayscale image data, ink layers of 8 layers are printed from the third printing of the ink layer to the tenth printing of the ink layer, and the printed ink layers of 8 layers are sequentially stacked, and in the portion in which the luminance value is included in the fourth luminance value range R4 in the grayscale image data, ink layers of 7 layers are printed from the fourth printing of the ink layer to the tenth printing of the ink layer, and the printed ink layers of 7 layers are sequentially stacked (see hatched portions in FIGS. 8A, 8B, 18A, and 18B).

In addition, when the thickly-piled portion 3a is formed, in the portion in which the luminance value is included in the fifth luminance value range R5 in the grayscale image data, ink layers of 6 layers are printed from the fifth printing of the ink layer to the tenth printing of the ink layer, and the printed ink layers of 6 layers are sequentially stacked, in the portion in which the luminance value is included in the sixth luminance value range R6 in the grayscale image data, ink layers of 5 layers are printed from the sixth printing of the ink layer to the tenth printing of the ink layer, and the printed ink layers of 5 layers are sequentially stacked, in the portion in which the luminance value is included in the seventh luminance value range R7 in the grayscale image data, ink layers of 4 layers are printed from the seventh printing of the ink layer to the tenth printing of the ink layer, and the printed ink layers of 4 layers are sequentially stacked, in the portion in which the luminance value is included in the eighth luminance value range R8 in the grayscale image data, ink layers of 3 layers are printed from the eighth printing of the ink layer to the tenth printing of the ink layer, and the printed ink layers of 3 layers are sequentially stacked, in the portion in which the luminance value is included in the ninth luminance value range R9 in the grayscale image data, ink layers of 2 layers are printed at the ninth printing of the ink layer and the tenth printing of the ink layer, and the printed ink layers of 2 layers are stacked, in the portion in which the luminance value is included in the tenth luminance value range R10 in the grayscale image data, an ink layer of 1 layer is printed at the tenth printing of the ink layer, and in the portion in which the luminance value is 0 in the grayscale image data, no ink layer is printed (see hatched portions in FIGS. 8A, 8B, 18A, and 18B).

FIG. 8A is a diagram for illustrating print data on each printing from the first printing of the ink layer to the tenth printing of the ink layer in a predetermined longitudinal section of the thickly-piled portion 3a printed based on the luminance value range shown in FIG. 6. For example, in a portion where the luminance value of the grayscale image data is 250, ink layers of 10 layers are printed from the first printing of the ink layer to the tenth printing of the ink layer, in a portion where the luminance value of the grayscale image data is 140, ink layers of 6 layers are printed from the fifth printing of the ink layer to the tenth printing of the ink layer, and in a portion where the luminance value of the grayscale image data is 30, ink layers of 2 layers are printed by the ninth printing of the ink layer and the tenth printing of the ink layer. FIG. 8B is a diagram for illustrating the unevenness state of the surface of the uneven portion 3 when the thickly-piled portion 3a is printed according to the print data shown in FIG. 8A.

In addition, FIG. 18A is a diagram for illustrating print data on each printing from the first printing of the ink layer to the tenth printing of the ink layer in a predetermined longitudinal section of the thickly-piled portion 3a printed based on the luminance value range shown in FIG. 17. For example, in a portion where the luminance value of the grayscale image data is 250, ink layers of 10 layers are printed from the first printing of the ink layer to the tenth printing of the ink layer, and in a portion where the luminance value of the grayscale image data is 228, ink layers of 9 layers are printed from the second printing of the ink layer to the tenth printing of the ink layer. FIG. 18B is a diagram for illustrating the unevenness state of the surface of the uneven portion 3 when the thickly-piled portion 3a is printed according to the print data shown in FIG. 18A.

In the case of the grayscale image data shown in FIG. 4, as shown in FIG. 6, since there is no deviation in frequency distribution over the entire region of the luminance values of 256 gradations (that is, since there is no histogram bias), even if the luminance values of 256 gradations are equally divided into 10 and 10 luminance value ranges are set as described above, and printing is performed as described above, the number of stacking of the ink layers in the portion constituting the thickly-piled portion 3a has variation as shown in FIG. 8B. Therefore, in the case of the grayscale image data shown in FIG. 4, even if the printing is performed as described above, as shown in FIG. 8B, the unevenness of the surface of the uneven portion 3 is clear, and the unevenness feeling appears on the surface of the uneven portion 3.

On the other hand, in the case of the grayscale image data shown in FIG. 5, as shown in FIG. 17, the frequency of the luminance values in the range from 255 to 150 and the frequency when the luminance value is 0 are large, and there is a bias in the frequency distribution (that is, there is a histogram bias). Therefore, when the luminance value of 256 gradations is equally divided into 10, 10 luminance value ranges are set, and printing is performed as described above, as shown in FIG. 18B, the number of stacking of the ink layers in the portion constituting the thickly-piled portion 3a is less likely to cause variation. Therefore, in the case of the grayscale image data shown in FIG. 5, when printing is performed as described above, as shown in FIG. 18B, the unevenness of the surface of the uneven portion 3 is not clear (that is, the surface of the uneven portion 3 is flat), and the unevenness feeling is less likely to appear on the surface of the uneven portion 3.

Thus, the present disclosure provides a print method for printing an uneven portion having unevenness on a surface on a print medium, the print method making it possible to clarify the unevenness of the surface of the uneven portion and express the unevenness feeling of the surface of the uneven portion regardless of whether there is a bias or there is no bias in a histogram of luminance values of grayscale image data in which the thickness of a thickly-piled portion being a portion for giving a thickness to the uneven portion is represented by a grayscale of predetermined gradations.

According to an aspect of the invention, a print method of the present disclosure is a print method for printing an uneven portion constituted by a plurality of stacked ink layers and having unevenness on a surface of the uneven portion on a print medium by an inkjet printer, the print method including: when a portion that gives a thickness to the uneven portion in the uneven portion is a thickly-piled portion, the number of stacking of the ink layers of a thickest portion in the thickly-piled portion is N, and a natural number of N or less is M, an image data preparation step of preparing grayscale image data being image data including the uneven portion and being image data representing a thickness of the thickly-piled portion with a grayscale of predetermined gradations; a histogram preparation step of preparing a histogram of luminance values of the grayscale image data prepared in the image data preparation step; a luminance value range setting step of dividing a luminance value of the predetermined gradations of the histogram prepared in the histogram preparation step into N and setting a range of N luminance values; and a printing step of performing printing on the print medium based on a luminance value range being a range of a luminance value set in the luminance value range setting step. The printing step includes performing printing of the ink layer N times when the thickly-piled portion is formed. A luminance value of a darkest portion in the grayscale image data is maximum. The luminance value range including a maximum luminance value being a maximum value among luminance values of the predetermined gradations is set as a maximum luminance value range, and the luminance value range not including a luminance value of 0 but including a luminance value of 1 is set as a minimum luminance value range. A luminance value of a darkest portion in the grayscale image data is included in the maximum luminance value range. When the thickly-piled portion is formed in the printing step, in a portion in which a luminance value is included in the M-th luminance value range from the maximum luminance value range toward the minimum luminance value range in the grayscale image data, printing of the ink layers of (N−M+1) layers from an M-th printing of the ink layer to an N-th printing of the ink layer is performed, and in a portion in which a luminance value is 0 in the grayscale image data, printing of the ink layer is not performed. The luminance value range setting step includes adjusting a division position of a luminance value of the predetermined gradations while checking the histogram displayed on a display that is predetermined.

In addition, according to another aspect of the invention, a print method of the present disclosure is a print method for printing an uneven portion constituted by a plurality of stacked ink layers and having unevenness on a surface of the uneven portion on a print medium by an inkjet printer, the print method including: when a portion that gives a thickness to the uneven portion in the uneven portion is a thickly-piled portion, the number of stacking of the ink layers of a thickest portion in the thickly-piled portion is N, and a natural number of N or less is M, an image data preparation step of preparing grayscale image data being image data including the uneven portion and being image data representing a thickness of the thickly-piled portion with a grayscale of predetermined gradations; a histogram preparation step of preparing a histogram of luminance values of the grayscale image data prepared in the image data preparation step; a luminance value range setting step of dividing a luminance value of the predetermined gradations of the histogram prepared in the histogram preparation step into N and setting a range of N luminance values; and a printing step of performing printing on the print medium based on a luminance value range being a range of a luminance value set in the luminance value range setting step. The printing step includes performing printing of the ink layer N times when the thickly-piled portion is formed. A luminance value of a darkest portion in the grayscale image data is minimum. The luminance value range not including a maximum luminance value being a maximum value among luminance values of the predetermined gradations but including a luminance value being a second largest after the maximum luminance value is set as a maximum luminance value range, and the luminance value range including a luminance value of 0 is set as a minimum luminance value range. A luminance value of a darkest portion in the grayscale image data is included in the minimum luminance value range. When the thickly-piled portion is formed in the printing step, in a portion in which a luminance value is included in the M-th luminance value range from the minimum luminance value range toward the maximum luminance value range in the grayscale image data, printing of the ink layers of (N−M+1) layers from an M-th printing of the ink layer to an N-th printing of the ink layer is performed, and in a portion in which a luminance value is the maximum luminance value in the grayscale image data, printing of the ink layer is not performed. The luminance value range setting step includes adjusting a division position of a luminance value of the predetermined gradations while checking the histogram displayed on a display that is predetermined.

In the print method of the present disclosure, in the luminance value range setting step, the division position of the luminance value of the predetermined gradations is adjusted while the histogram displayed on the display that is predetermined is checked. Therefore, in the present disclosure, it is possible to set the division position of the luminance value of the predetermined gradations to be divided into N so that the unevenness of the surface of the uneven portion can be made clear regardless of whether there is a bias or there is no bias in the histogram of the luminance values of the grayscale image data in which the thickness of the thickly-piled portion is represented with the grayscale of the predetermined gradations. Therefore, when printing is performed in the print method of the present disclosure, it is possible to make the unevenness of the surface of the uneven portion clear and express the unevenness feeling of the surface of the uneven portion regardless of whether there is a bias or there is no bias in the histogram of the luminance values of the grayscale image data.

In the present disclosure, in the luminance value range setting step, for example, when the frequency in a specific range of the histogram increases, the number of divisions of the luminance value of the predetermined gradations in the specific range is increased.

In the present disclosure, in the luminance value range setting step, it is preferable that the division position of the luminance value of the predetermined gradations can be set to any position. With this configuration, it is possible to set the division position of the luminance value of the predetermined gradations which is to be divided into N so that the unevenness of the surface of the uneven portion can be made clearer.

In the present disclosure, in the luminance value range setting step, an image corresponding to the ink layer on which printing is to be performed for the M-th time in the thickly-piled portion is preferably displayable on the display. With this configuration, in the luminance value range setting step, the division position of the luminance value of the predetermined gradations can be adjusted while the image corresponding to each ink layer in the thickly-piled portion is checked on the display. Therefore, it is possible to set the division position of the luminance value of the predetermined gradations which is to be divided into N so that the unevenness of the surface of the uneven portion can be made clearer.

In the present disclosure, for example, the thickly-piled portion is formed by stacking ink layers made of a cured clear ink. The uneven portion includes a color ink layer made of a cured color ink and the thickly-piled portion. The thickly-piled portion is formed on the color ink layer, or the color ink layer is formed on the thickly-piled portion. In addition, in the present disclosure, the thickly-piled portion may be formed by stacking ink layers made of a cured color ink. The uneven portion may include a color ink layer made of a cured color ink, a white ink layer made of a cured white ink, and the thickly-piled portion. The white ink layer may be formed on the thickly-piled portion, and the color ink layer is formed on the white ink layer.

As described above, in the present disclosure, in a print method for printing an uneven portion having unevenness on a surface on a print medium, it is possible to make the unevenness of the surface of the uneven portion clear and express the unevenness feeling of the surface of the uneven portion regardless of whether there is a bias or there is no bias in a histogram of luminance values of grayscale image data in which the thickness of a thickly-piled portion being a portion for giving a thickness to the uneven portion is represented by a grayscale of predetermined gradations.

DETAILED DESCRIPTION OF EMBODIMENTS

Hereinafter, embodiments of the present disclosure will be described with reference to the drawings.

(Configuration of Printing System)

Figure 1:
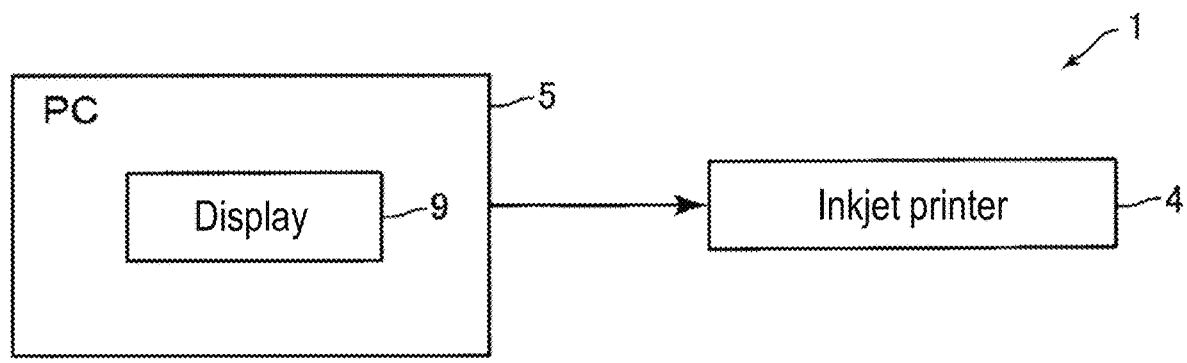
FIG. 1 is a block diagram for illustrating a configuration of a printing system used in a print method according to an embodiment of the present disclosure.
Figure 2:
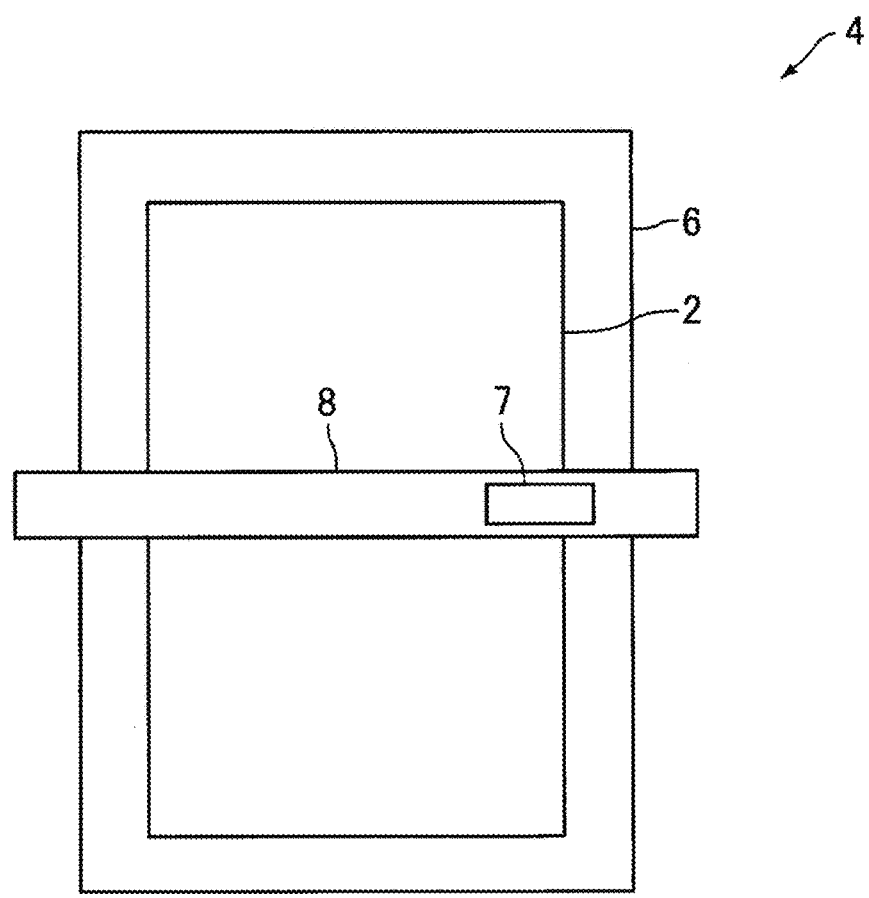
FIG. 2 is a schematic plan view of an inkjet printer shown in FIG. 1.

FIG. 1 is a block diagram for illustrating a configuration of a printing system 1 used in a print method according to an embodiment of the present disclosure. FIG. 2 is a schematic plan view of an inkjet printer 4 shown in FIG. 1.

In the print method of the present embodiment, the uneven portion 3 (see FIG. 8B and the like) configured by a plurality of stacked ink layers and having unevenness on the surface is printed on the print medium 2 using the printing system 1. In addition, in the print method of the present embodiment, printing is performed on the print medium 2 by the inkjet printer 4 (hereinafter referred to as a "printer 4"). The print medium 2 is, for example, a printing paper, a thin resin plate, or the like. The print medium 2 of the present embodiment is white printing paper or a thin resin plate. The printing system 1 includes a printer 4 and a host apparatus 5 for controlling the printer 4. The host apparatus 5 of the present embodiment is a personal computer (PC). Therefore, hereinafter, the host apparatus 5 is referred to as a "PC 5".

The printer 4 includes a table 6 on which the print medium 2 is placed, an inkjet head that ejects ink toward the print medium 2 placed on the table 6, a carriage 7 on which the inkjet head is mounted, a Y bar 8 that holds the carriage 7 so as to be movable in the main scanning direction, a carriage drive mechanism that moves the carriage 7 in the main scanning direction, and a Y bar drive mechanism that moves the Y bar 8 in the sub-scanning direction. The carriage 7 is disposed above the table 6. The inkjet head of the present embodiment ejects an ultraviolet-curable ink. In addition, the printer 4 includes an ultraviolet irradiator that irradiates the ink ejected from the inkjet head with ultraviolet light to cure the ink. The ultraviolet irradiator is mounted on the carriage 7.

The printer 4 sequentially stacks an ink layer formed by the ink ejected from the inkjet head and cured by the ultraviolet light applied from the ultraviolet irradiator on the upper surface of the print medium 2, and prints the uneven portion 3 on the print medium 2. When a portion that gives a thickness to the uneven portion 3 in the uneven portion 3 is a thickly-piled portion 3a (see FIG. 8B and the like), the thickly-piled portion 3a is formed of a cured clear ink. Specifically, the thickly-piled portion 3a is formed by stacking ink layers made of the cured clear ink. That is, the thickly-piled portion 3a is configured by the stacked ink layers of the clear ink.

In the present embodiment, the number of stacking of the ink layers in the thickest portion in the thickly-piled portion 3a is 10. That is, the thickest portion in the thickly-piled portion 3a is constituted by stacked ink layers of 10 layers. In addition, the uneven portion 3 of the present embodiment includes a color ink layer 3b (see FIG. 8B and the like) made of a cured color ink, and a thickly-piled portion 3a. The color ink layer 3b is made of an ink layer of one layer. The color ink layer 3b is formed between the thickly-piled portion 3a and the print medium 2. That is, the thickly-piled portion 3a is formed on the color ink layer 3b.

The PC 5 includes various types of hardware such as storage devices such as a ROM, a RAM, and a hard disk drive, and calculation devices such as a CPU. In addition, the PC 5 includes a display 9 such as a liquid crystal display apparatus. The PC 5 is installed with software (image editing software) for preparing and editing image data for printing and software (software RIP) for controlling the printer 4. The PC 5 prepares data for printing and transmits the data to the printer 4. Hereinafter, a print method of the present embodiment will be described.

(Print Method)

Figure 3:
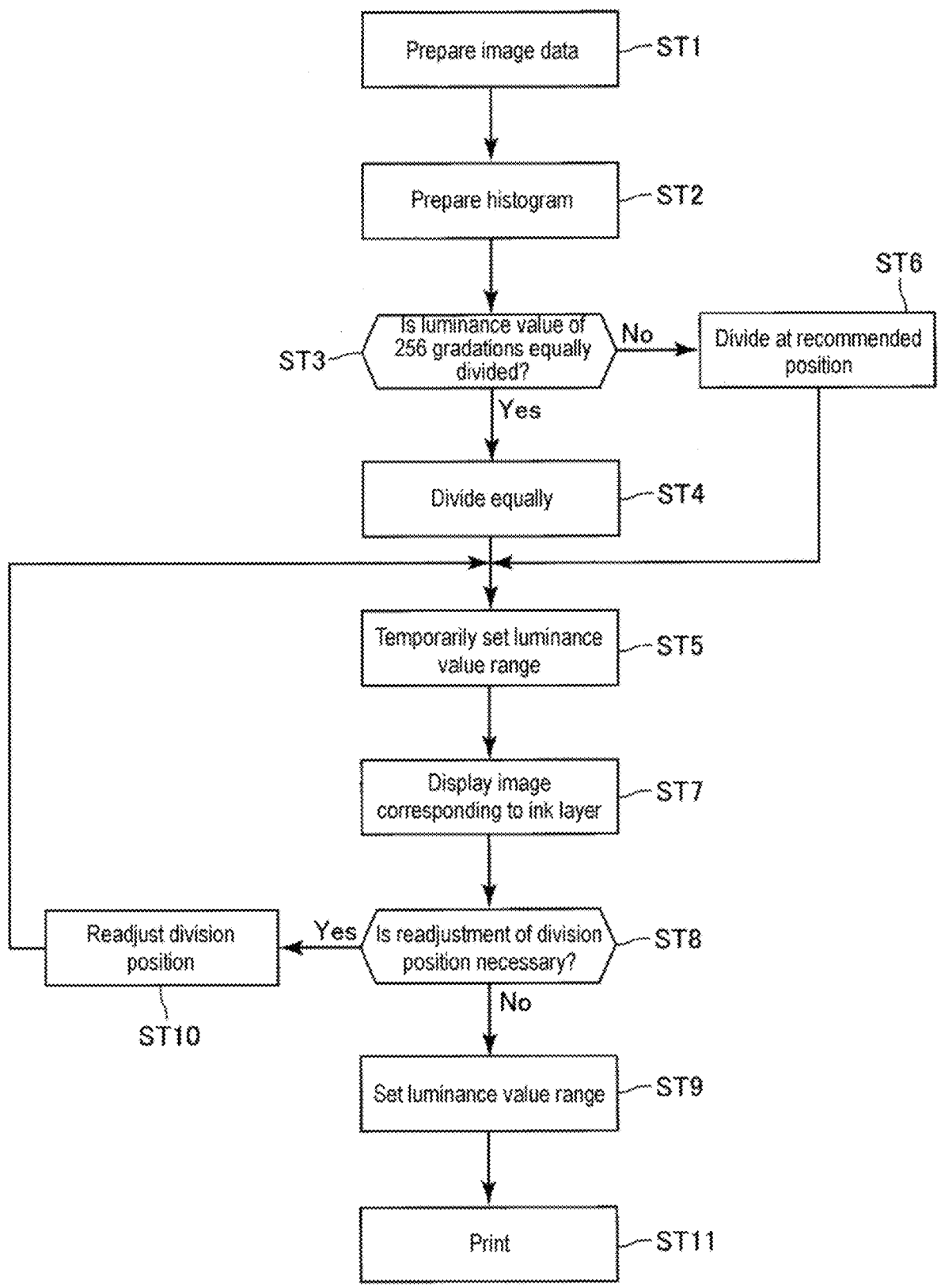
FIG. 3 is a flowchart for illustrating the print method according to the embodiment of the present disclosure.
Figure 4:
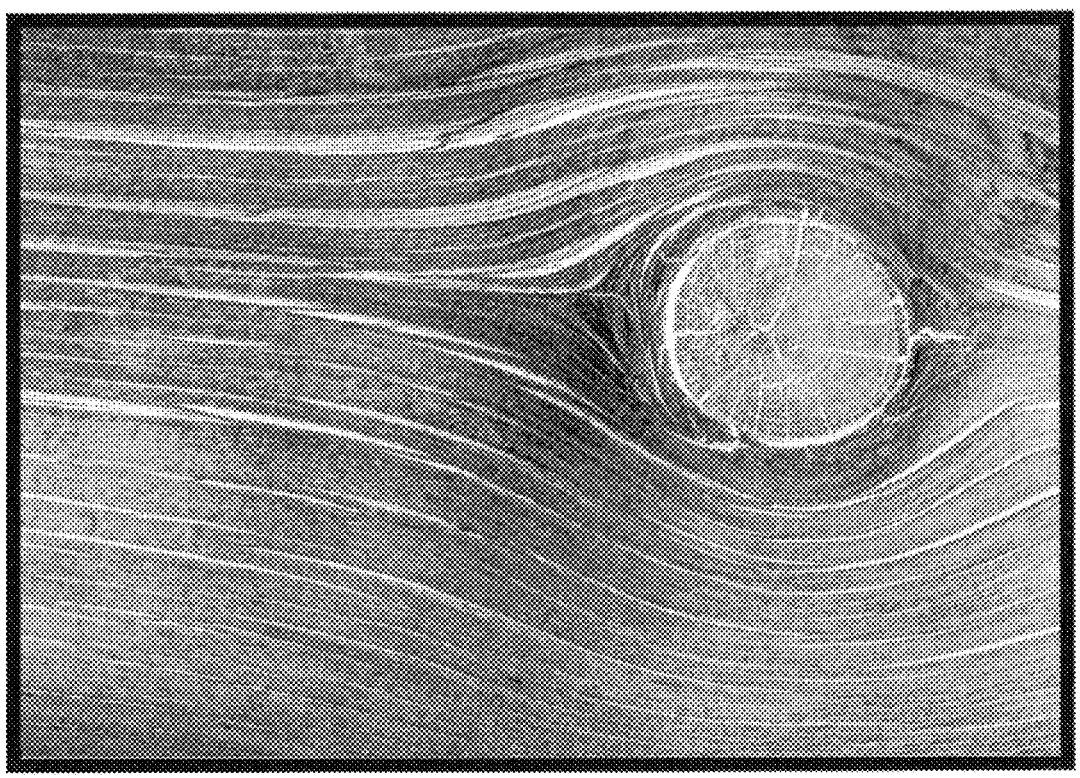
FIG. 4 is a diagram showing examples of the grayscale image data prepared in the image data preparation step shown in FIG. 3.
Figure 5:
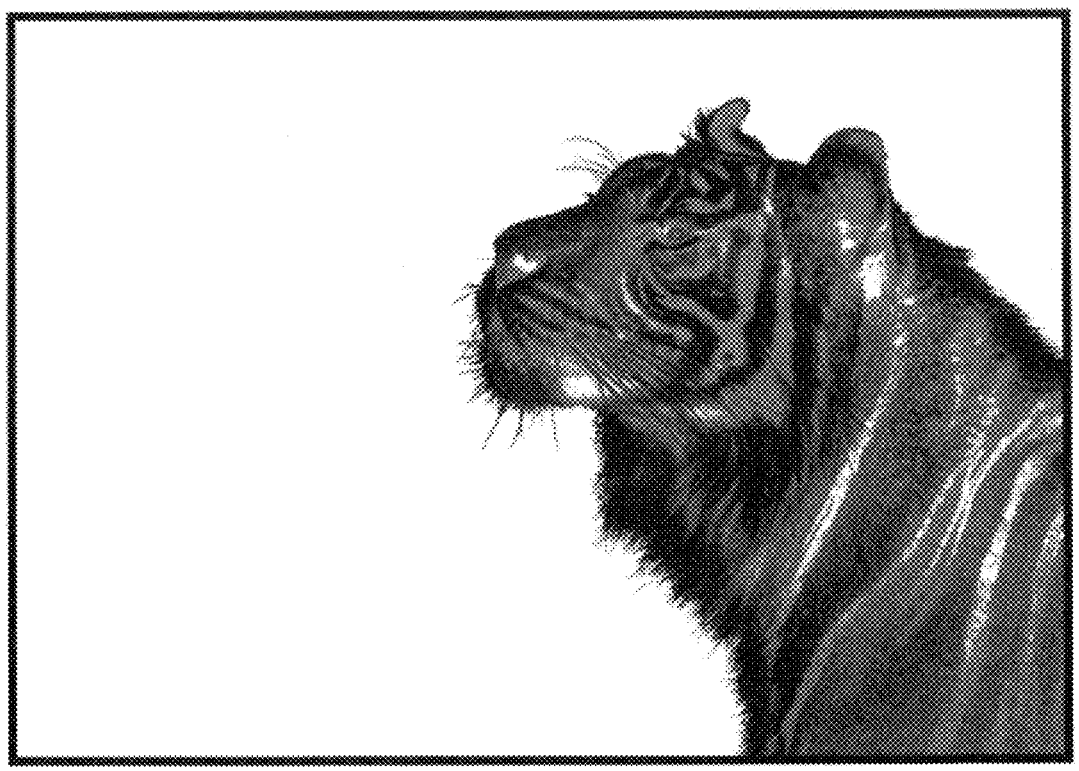
FIG. 5 is a diagram showing examples of the grayscale image data prepared in the image data preparation step shown in FIG. 3.
Figure 6:
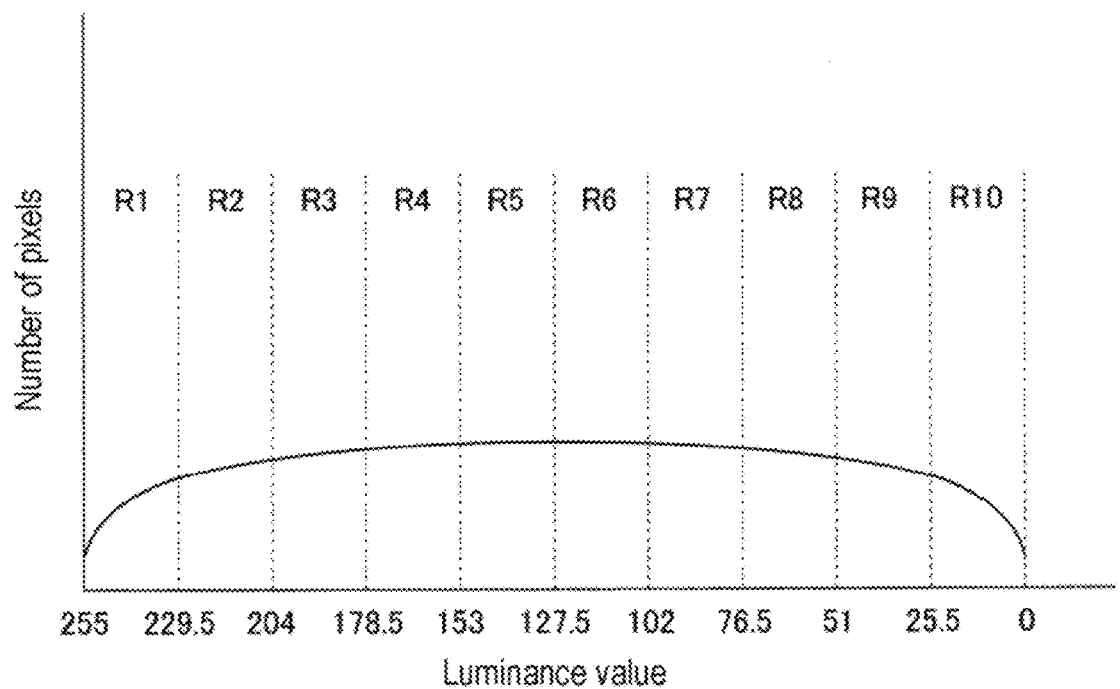
FIG. 6 is a histogram of luminance values of the grayscale image data shown in FIG. 4.
Figure 7:
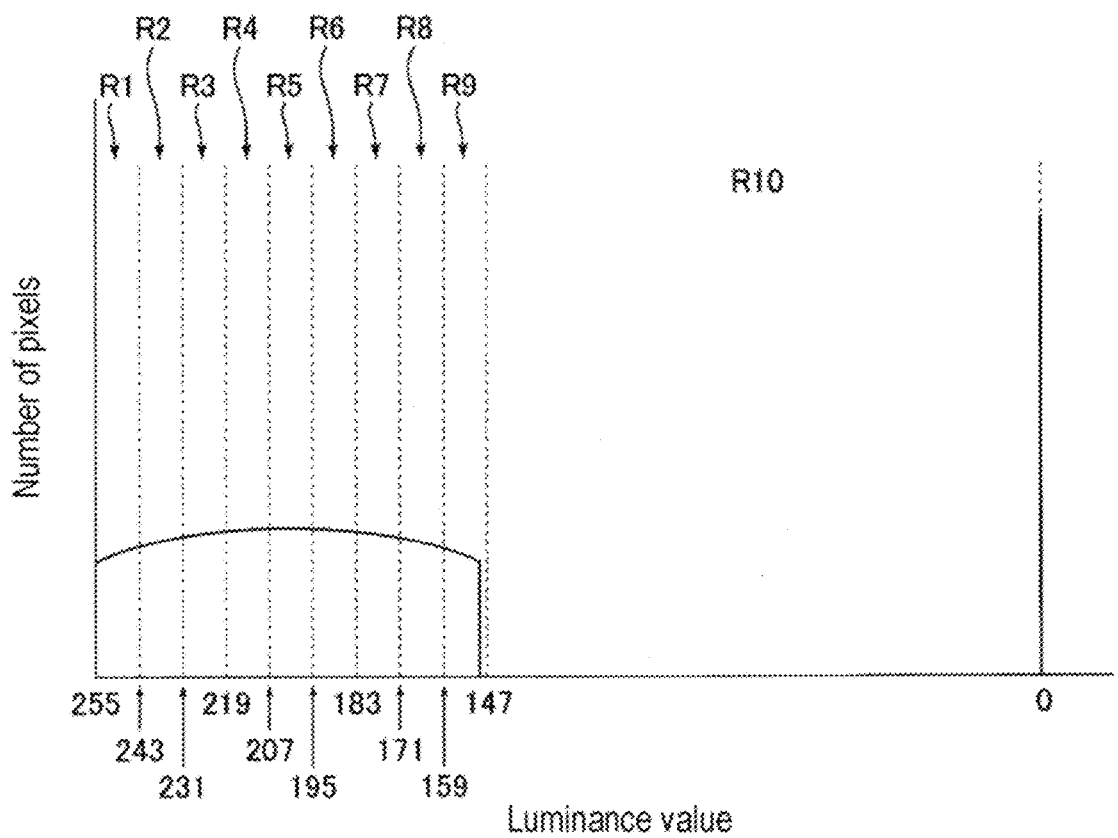
FIG. 7 is a histogram of luminance values of the grayscale image data shown in FIG. 5.
Figure 8A:
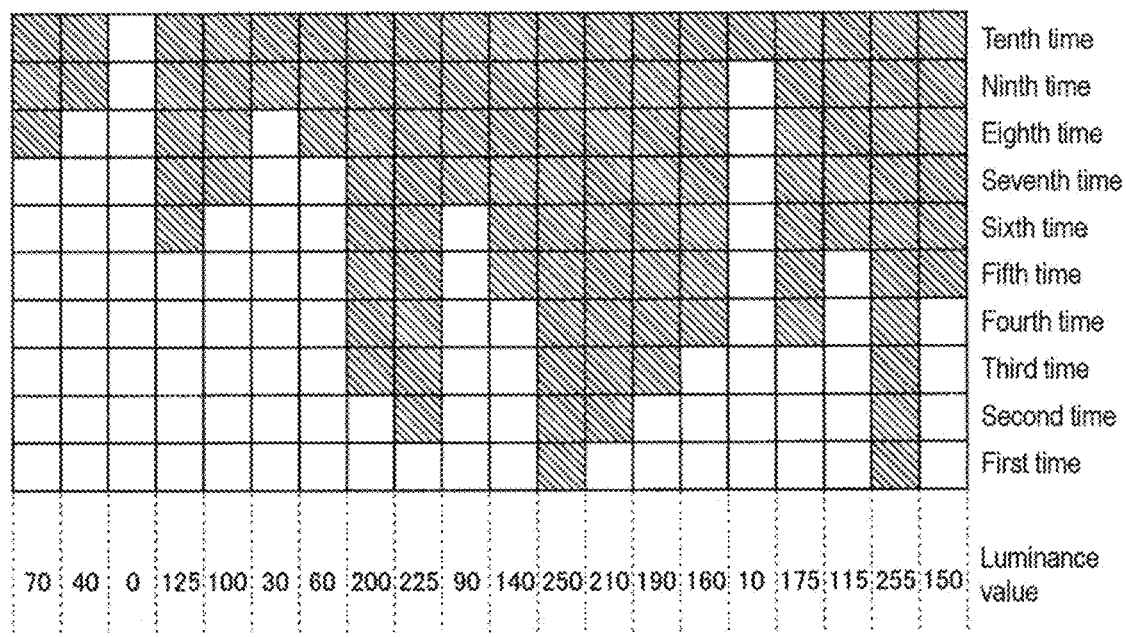
FIG. 8A is a diagram for illustrating print data on each printing from the first printing of the ink layer to the tenth printing of the ink layer in a predetermined longitudinal section of the thickly-piled portion printed based on the luminance value range shown in FIG. 6.
Figure 8B:
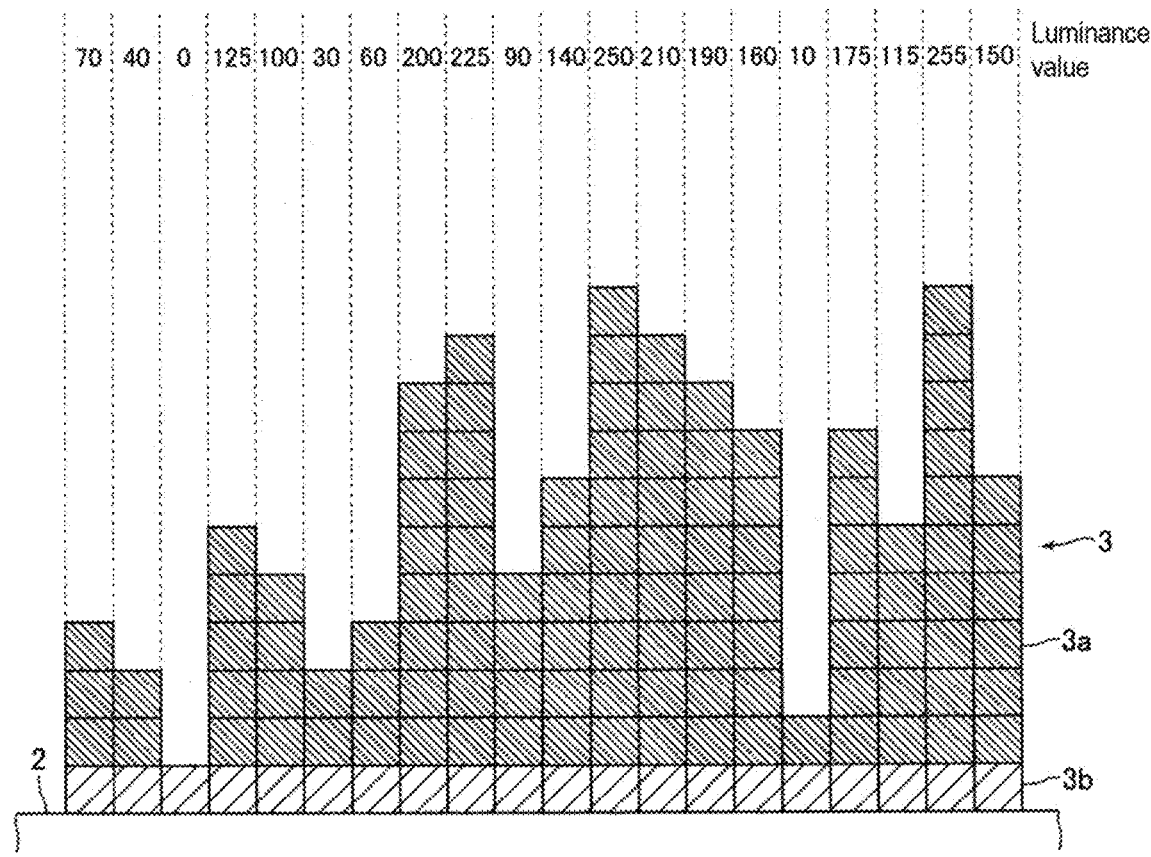
FIG. 8B is a diagram for illustrating an unevenness state of a surface of the uneven portion when the thickly-piled portion is printed according to the print data shown in FIG. 8A.
Figure 9A:
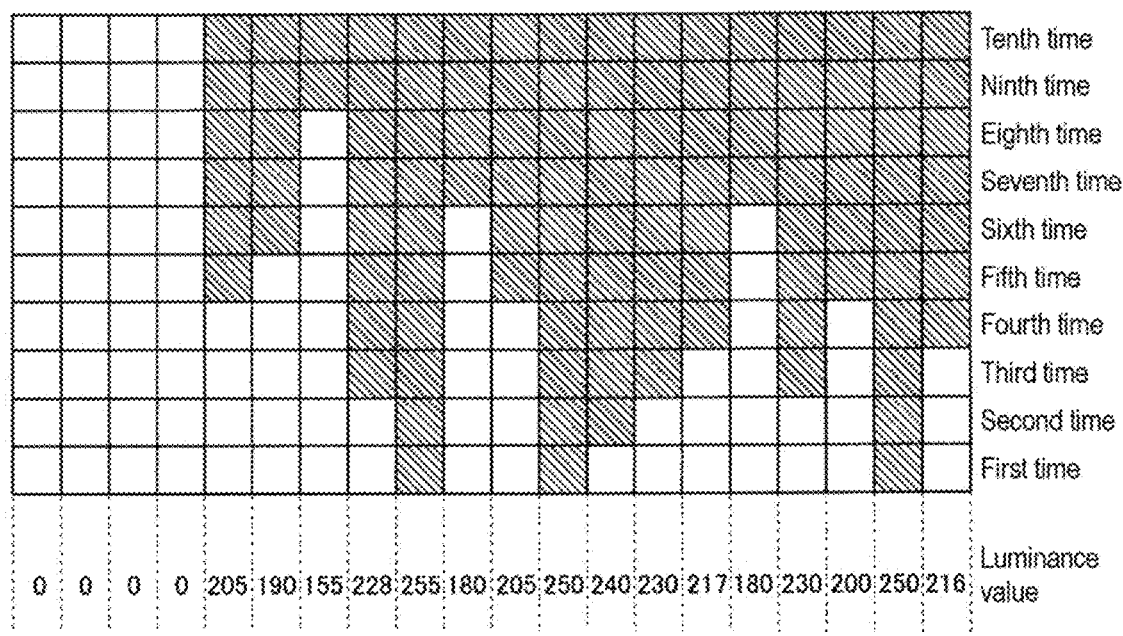
FIG. 9A is a diagram for illustrating print data on each printing from the first printing of the ink layer to the tenth printing of the ink layer in a predetermined longitudinal section of the thickly-piled portion printed based on the luminance value range shown in FIG. 7.
Figure 9B:
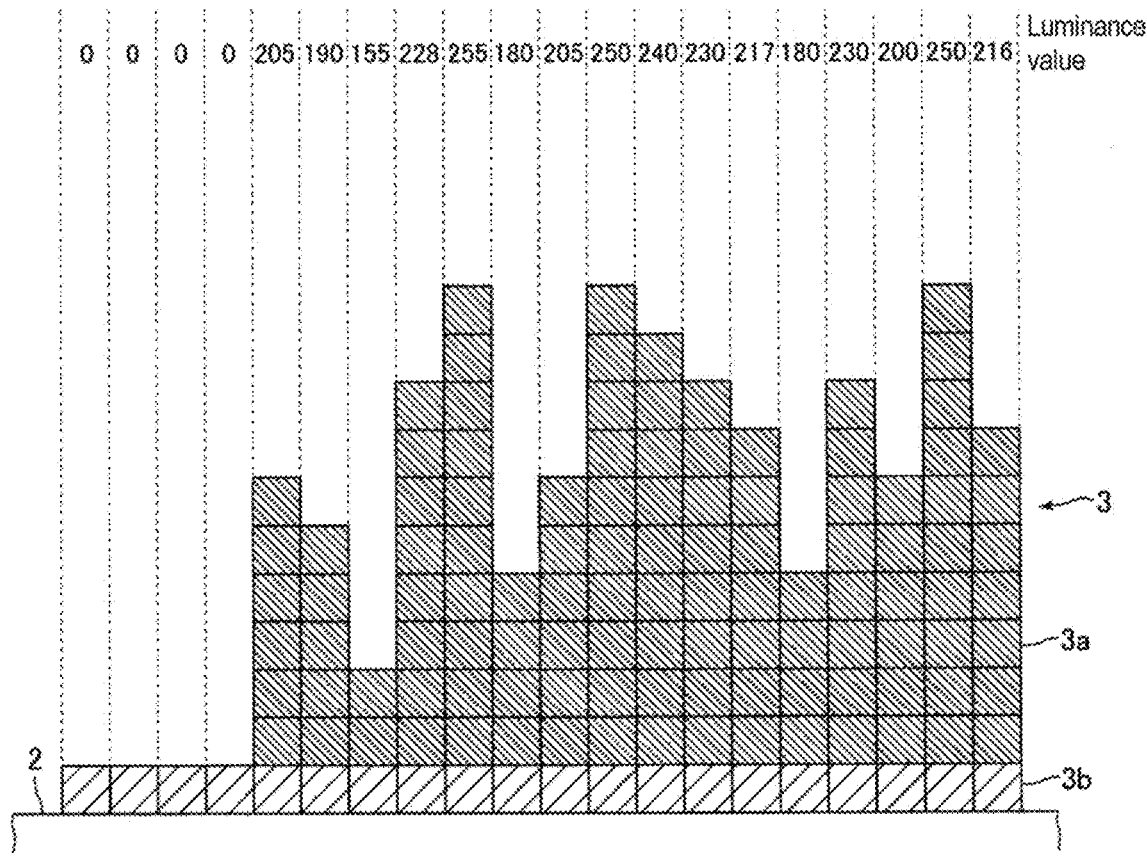
FIG. 9B is a diagram for illustrating an unevenness state of a surface of the uneven portion when the thickly-piled portion is printed according to the print data shown in FIG. 9A.

FIG. 3 is a flowchart for illustrating the print method according to the embodiment of the present disclosure. FIGS. 4 and 5 are diagrams showing examples of the grayscale image data prepared in the image data preparation step ST1 shown in FIG. 3. FIG. 6 is a histogram of luminance values of the grayscale image data shown in FIG. 4. FIG. 7 is a histogram of luminance values of the grayscale image data shown in FIG. 5. FIG. 8A is a diagram for illustrating print data on each printing from the first printing of the ink layer to the tenth printing of the ink layer in a predetermined longitudinal section of the thickly-piled portion 3a printed based on the luminance value range shown in FIG. 6, and FIG. 8B is a diagram for illustrating an unevenness state of a surface of the uneven portion 3 when the thickly-piled portion 3a is printed according to the print data shown in FIG. 8A. FIG. 9A is a diagram for illustrating print data on each printing from the first printing of the ink layer to the tenth printing of the ink layer in a predetermined longitudinal section of the thickly-piled portion 3a printed based on the luminance value range shown in FIG. 7, and FIG. 9B is a diagram for illustrating an unevenness state of a surface of the uneven portion 3 when the thickly-piled portion 3a is printed according to the print data shown in FIG. 9A. FIGS. 10A to 10F and 11A to 11D are diagrams showing images displayed on the display 9 in the image display step ST7 in the case of the grayscale image data shown in FIG. 4. FIGS. 12A to 12F and 13A to 13D are diagrams showing images displayed on the display 9 in the image display step ST7 in the case of the grayscale image data shown in FIG. 5.

In the print method of the present embodiment, a woodgrain uneven portion 3 is printed on the entire print medium 2 (see FIG. 4). In addition, in the print method of the present embodiment, an uneven portion 3 made of a picture of a tiger is printed on a part of the print medium 2 (see FIG. 5). When printing is performed on the print medium 2, first, grayscale image data being image data including the uneven portion 3 to be printed on the print medium 2 and being image data representing the thickness (height) of the thickly-piled portion 3a with grayscale of predetermined gradations is prepared (image data generation step ST1). Specifically, the grayscale image data shown in FIG. 4 and the grayscale image data shown in FIG. 5 are prepared. In the present embodiment, grayscale image data in which the thickness of the thickly-piled portion 3a is represented with a grayscale of 256 gradations (8-bit) is prepared.

In the image data generation step ST1, the operator prepares grayscale image data using the PC 5. Specifically, the operator prepares grayscale image data using the PC 5 while checking the image displayed on the display 9. In the grayscale image data shown in FIGS. 4 and 5, the density of the image increases as the thickness of the thickly-piled portion 3a increases. That is, in the grayscale image data shown in FIGS. 4 and 5, the image becomes darker as the thickness of the thickly-piled portion 3a increases. The number of pixels of the grayscale image data shown in FIGS. 4 and 5 is, for example, 360,000 pixels. In addition, in the image data generation step ST1, the operator also prepares color image data for printing the color ink layer 3b. It should be noted that in the image data generation step ST1, for example, the PC 5 may automatically prepare the grayscale image data based on the data captured in the PC 5 using the 3D scanner.

Thereafter, a histogram of luminance values of the grayscale image data prepared in the image data generation step ST1 is prepared (histogram preparation step ST2). That is, in the histogram preparation step ST2, a histogram of the luminance values of the grayscale image data with the luminance value of 256 gradations (0 to 255) on the horizontal axis and the number of pixels on the vertical axis is prepared. In the histogram preparation step ST2, the PC 5 automatically prepares a histogram of luminance values of the grayscale image data.

The histogram shown in FIG. 6 is a histogram of luminance values of the grayscale image data shown in FIG. 4, and the histogram shown in FIG. 7 is a histogram of luminance values of the grayscale image data shown in FIG. 5. In the histograms shown in FIGS. 6 and 7, the luminance value increases as the images in FIGS. 4 and 5 become darker (that is, as the density of the image increases). That is, in the present embodiment, the luminance value of the darkest portion in the grayscale image data shown in FIGS. 4 and 5 is the maximum, and the luminance value of the brightest portion in the grayscale image data is the minimum. Specifically, in the present embodiment, the luminance value of the darkest portion in the grayscale image data is 255, and the luminance value of the brightest portion in the grayscale image data is 0.

Thereafter, the luminance value of 256 gradations of the histogram prepared in the histogram preparation step ST2 is divided into 10, and a range of 10 luminance values (luminance value range) is set (luminance value range setting steps ST3 to ST10). That is, the luminance value of 256 gradations of the histogram is divided into 10 being is the same number as the number of stacking of the ink layers of the thickest portion in the thickly-piled portion 3a, and 10 luminance value ranges are set.

Specifically, first, the operator determines whether to equally divide the luminance value of 256 gradations of the histogram into 10 while checking the histogram displayed on the display 9 (step ST3). As with the histogram shown in FIG. 6, when there is no bias in frequency distribution over the entire region of the luminance values of 256 gradations (that is, when there is no histogram bias), the operator equally divides the luminance value of 256 gradations into 10 (step ST4), and temporarily sets 10 luminance value ranges (step ST5).

That is, luminance value of 256 gradations is equally divided into 10, and 10 luminance value ranges of a first luminance value range R1 in which the luminance value is 255 or less and 229.5 or more, a second luminance value range R2 in which the luminance value is less than 229.5 and 204 or more, a third luminance value range R3 in which the luminance value is less than 204 and 178.5 or more, a fourth luminance value range R4 in which the luminance value is less than 178.5 and 153 or more, a fifth luminance value range R5 in which the luminance value is less than 153 and 127.5 or more, a sixth luminance value range R6 in which the luminance value is less than 127.5 and 102 or more, a seventh luminance value range R7 in which the luminance value is less than 102 and 76.5 or more, an eighth luminance value range R8 in which the luminance value is less than 76.5 and 51 or more, a ninth luminance value range R9 in which the luminance value is less than 51 and 25.5 or more, and a tenth luminance value range R10 in which the luminance value is less than 25.5 and exceeds 0 are temporarily set (see FIG. 6). In the present embodiment, when the operator performs a predetermined operation on the PC 5, the luminance value of 256 gradations is automatically and equally divided into 10, and 10 luminance value ranges are temporarily set.

On the other hand, as with the histogram shown in FIG. 7, when the frequency of the luminance values in the range from 255 to 150 and the frequency of the luminance values at 0 are large and there is a bias in the frequency distribution (that is, when there is a histogram bias), the luminance value of 256 gradations is divided into 10 at the recommended position (step ST6), and 10 luminance value ranges are temporarily set (step ST5). In the present embodiment, when the operator performs a predetermined operation on the PC 5, the luminance value of 256 gradations is automatically divided into 10 at the recommended position, and 10 luminance value ranges are temporarily set.

In the present embodiment, for example, in step ST6, as shown in FIG. 7, the luminance value of 256 gradations is divided into 10, and in step ST5, 10 luminance value ranges of a first luminance value range R1 in which the luminance value is 255 or less and 243 or more, a second luminance value range R2 in which the luminance value is less than 243 and 231 or more, a third luminance value range R3 in which the luminance value is less than 231 and 219 or more, a fourth luminance value range R4 in which the luminance value is less than 219 and 207 or more, a fifth luminance value range R5 in which the luminance value is less than 207 and 195 or more, a sixth luminance value range R6 in which the luminance value is less than 195 and 183 or more, a seventh luminance value range R7 in which the luminance value is less than 183 and 171 or more, an eighth luminance value range R8 in which the luminance value is less than 171 and 159 or more, a ninth luminance value range R9 in which the luminance value is less than 159 and 147 or more, and a tenth luminance value range R10 in which the luminance value is less than 147 and exceeds 0 are temporarily set (see FIG. 7).

As described above, in step ST6, when the frequency of a specific range of the histogram increases, the number of divisions of the luminance value of 256 gradations in this specific range is increased. Specifically, in the present embodiment, since the frequency of the luminance values in the range from 255 to 150 increases, the number of divisions of the luminance value of 256 gradations in this range is increased.

The first luminance value range R1 of the present embodiment is a maximum luminance value range being a luminance value range including a maximum luminance value (that is, luminance value 255) being a maximum value among the luminance values of 256 gradations. In addition, the tenth luminance value range R10 of the present embodiment is a minimum luminance value range being a luminance value range not including luminance value 0 but including luminance value 1. It should be noted that in the present embodiment, the luminance value of the darkest portion (specifically, luminance value 255) in the grayscale image data shown in FIGS. 4 and 5 is included in the first luminance value range R1 being the maximum luminance value range, and the first luminance value range R1 is set so that the luminance value of the darkest portion in the grayscale image data shown in FIGS. 4 and 5 is included in the first luminance value range R1.

Here, when the 10 luminance value ranges temporarily set in step ST5 are officially set as the luminance value ranges in step ST9 described below, printing is performed on the print medium 2 in a printing step ST11 described below. Since the color ink layer 3*b* includes an ink layer of one layer, printing of the ink layer is performed once when the color ink layer 3*b* is formed in the printing step ST11. In addition, in the present embodiment, since the thickest portion in the thickly-piled portion 3*a* includes ink layers of 10 layers, the printing of the ink layers is performed 10 times when the thickly-piled portion 3*a* is formed in the printing step ST11.

In addition, when the thickly-piled portion 3*a* is formed in the printing step ST11, ink layers of 10 layers from the first printing of the ink layer to the tenth printing of the ink layer are printed in the portion in which the luminance value is included in the first luminance value range R1 in the grayscale image data, ink layers of 9 layers from the second printing of the ink layer to the tenth printing of the ink layer are printed in the portion in which the luminance value is included in the second luminance value range R2 in the grayscale image data, ink layers of 8 layers from the third printing of the ink layer to the tenth printing of the ink layer are printed in the portion in which the luminance value is included in the third luminance value range R3 in the grayscale image data, ink layers of 7 layers from the printing of the fourth ink layer to the printing of the tenth ink layer are printed in the portion in which the luminance value is included in the fourth luminance value range R4 in the grayscale image data, ink layers of 6 layers from the printing of the fifth ink layer to the printing of the tenth ink layer are printed in the portion in which the luminance value is included in the fifth luminance value range R5 in the grayscale image data, ink layers of 5 layers from the printing of the sixth ink layer to the printing of the tenth ink layer are printed in the portion in which the luminance value is included in the sixth luminance value range R6 in the grayscale image data, ink layers of 4 layers from the printing of the seventh ink layer to the printing of the tenth ink layer are printed in the portion in which the luminance value is included in the seventh luminance value range R7 in the grayscale image data, ink layers of 3 layers from the printing of the eighth ink layer to the printing of the tenth ink layer are printed in the portion in which the luminance value is included in the eighth luminance value range R8 in the grayscale image data, ink layers of 2 layers at the printing of the ninth ink layer and the printing of the tenth ink layer are printed in the portion in which the luminance value is included in the ninth luminance value range R9 in the grayscale image data, an ink layer of 1 layer at the printing of the tenth ink layer is printed in the portion in which the luminance value is included in the tenth luminance value range R10 in the grayscale image data, and no ink layer is printed in the portion in which the luminance value is 0 in the grayscale image data (see hatched portions in FIGS. 8A and 9A).

When 10 luminance value ranges are temporarily set in step ST5, an image corresponding to the ink layer to be printed for the first time of the thickly-piled portion 3a, an image corresponding to the ink layer to be printed for the second time of the thickly-piled portion 3a, an image corresponding to the ink layer to be printed for the third time of the thickly-piled portion 3a, an image corresponding to the ink layer to be printed for the fourth time of the thickly-piled portion 3a, an image corresponding to the ink layer to be printed for the fifth time of the thickly-piled portion 3a, an image corresponding to the ink layer to be printed for the sixth time of the thickly-piled portion 3a, an image corresponding to the ink layer to be printed for the seventh time of the thickly-piled portion 3a, an image corresponding to the ink layer to be printed for the eighth time of the thickly-piled portion 3a, an image corresponding to the ink layer to be printed for the ninth time of the thickly-piled portion 3a, and an image corresponding to the ink layer to be printed for the tenth time of the thickly-piled portion 3a can be displayed on the display 9.

That is, assuming that M is a natural number of 10 or less, when 10 luminance value ranges are temporarily set in step ST5, an image corresponding to the ink layer to be printed for the M-th time of the thickly-piled portion 3a can be displayed on the display 9. In the present embodiment, the black-and-white image (see FIGS. 10A to 13D) corresponding to the ink layer to be printed for the M-th time of the thickly-piled portion 3a can be displayed, and the clear ink is printed on the black portion of the black-and-white image. The operator displays, on the display 9, images corresponding to some of 10 times of ink layers or images corresponding to all of 10 times of ink layers from the image corresponding to the ink layer to be printed for the first time in the thickly-piled portion 3a to the image corresponding to the ink layer to be printed for the tenth time in the thickly-piled portion 3a, and checks the images corresponding to the respective ink layers (image display step ST7).

In the image display step ST7, for example, when the operator performs a predetermined operation on the PC 5, the images corresponding to all the ink layers of 10 times are automatically collectively displayed on the display 9. Specifically, images corresponding to the 10 ink layers shown in FIGS. 10 and 11 or images corresponding to the 10 ink layers shown in FIGS. 12 and 13 are collectively displayed on the display 9.

It should be noted that FIGS. 10 and 11 are images that can be displayed in the image display step ST7 when the grayscale image data shown in FIG. 4 is prepared in the image data generation step ST1. Specifically, the image shown in FIG. 10A is an image corresponding to an ink layer to be printed for the first time, the image shown in FIG. 10B is an image corresponding to an ink layer to be printed for the second time, the image shown in FIG. 10C is an image corresponding to an ink layer to be printed for the third time, the image shown in FIG. 10D is an image corresponding to an ink layer to be printed for the fourth time, the image shown in FIG. 10E is an image corresponding to an ink layer to be printed for the fifth time, the image shown in FIG. 10F is an image corresponding to an ink layer to be printed for the sixth time, the image shown in FIG. 11A is an image corresponding to an ink layer to be printed for the seventh time, the image shown in FIG. 11B is an image corresponding to an ink layer to be printed for the eighth time, the image shown in FIG. 11C is an image corresponding to an ink layer to be printed for the ninth time, and the image shown in FIG. 11D is an image corresponding to an ink layer to be printed for the tenth time.

In addition, FIGS. 12 and 13 are images that can be displayed in the image display step ST7 when the grayscale image data shown in FIG. 5 is prepared in the image data generation step ST1. Specifically, the image shown in FIG. 12A is an image corresponding to an ink layer to be printed for the first time, the image shown in FIG. 12B is an image corresponding to an ink layer to be printed for the second time, the image shown in FIG. 12C is an image corresponding to an ink layer to be printed for the third time, the image shown in FIG. 12D is an image corresponding to an ink layer to be printed for the fourth time, the image shown in FIG. 12E is an image corresponding to an ink layer to be printed for the fifth time, the image shown in FIG. 12F is an image corresponding to an ink layer to be printed for the sixth time, the image shown in FIG. 13A is an image corresponding to an ink layer to be printed for the seventh time, the image shown in FIG. 13B is an image corresponding to an ink layer to be printed for the eighth time, the image shown in FIG. 13C is an image corresponding to an ink layer to be printed for the ninth time, and the image shown in FIG. 13D is an image corresponding to an ink layer to be printed for the tenth time.

Alternatively, in the image display step ST7, for example, when the operator selects any one of the luminance value ranges from the first luminance value range R1 to the tenth luminance value range R10 on the display 9, the image of the ink layer corresponding to the selected luminance value range is individually displayed on the display 9.

Figure 10A:
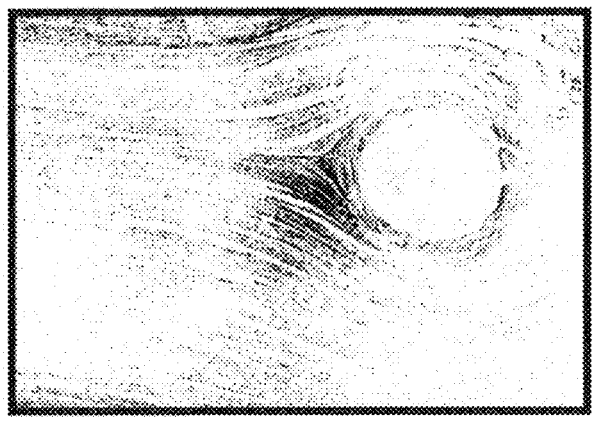
FIGS. 10A to 10F are diagrams showing an image displayed on the display in the image display step in the case of the grayscale image data shown in FIG. 4.
Figure 10B:
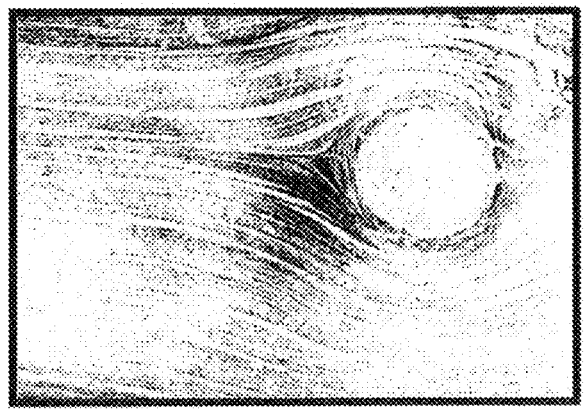
Figure 10C:
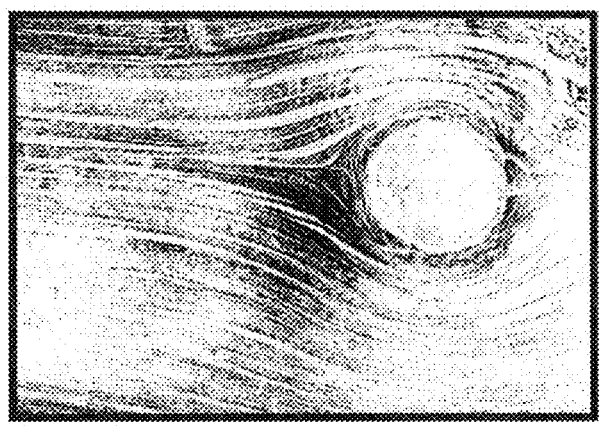
Figure 10D:
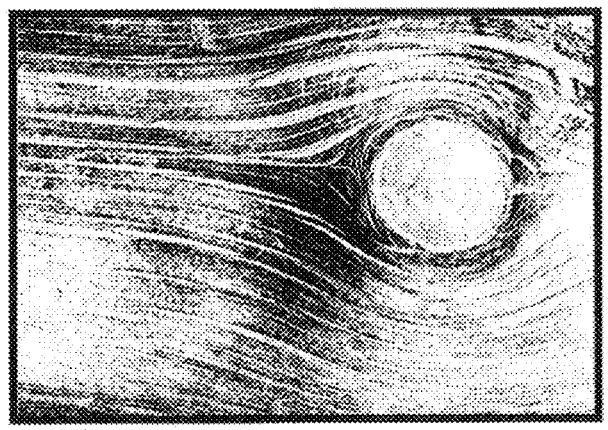
Figure 10E:
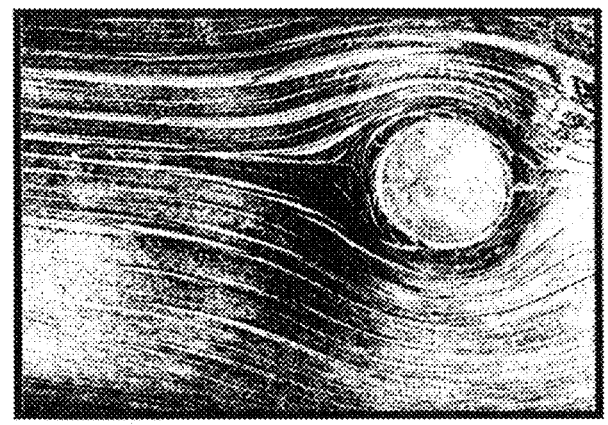
Figure 10F:
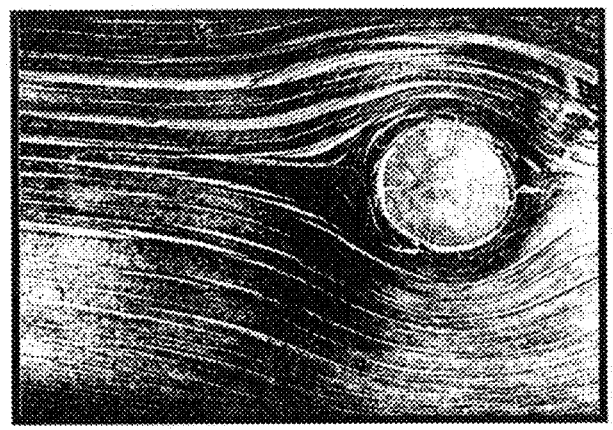
Figure 11A:
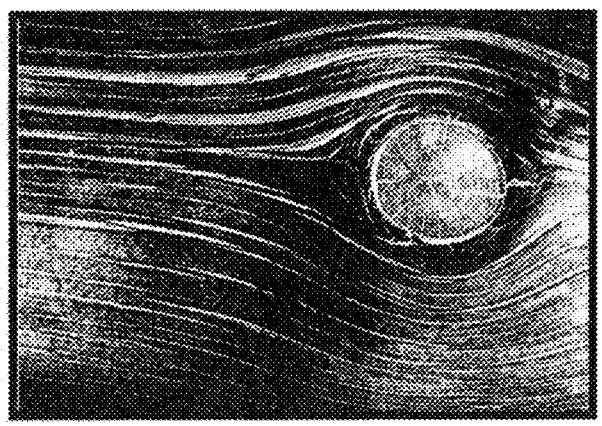
FIGS. 11A to 11D are diagrams showing an image displayed on the display in the image display step in the case of the grayscale image data shown in FIG. 4.
Figure 11B:
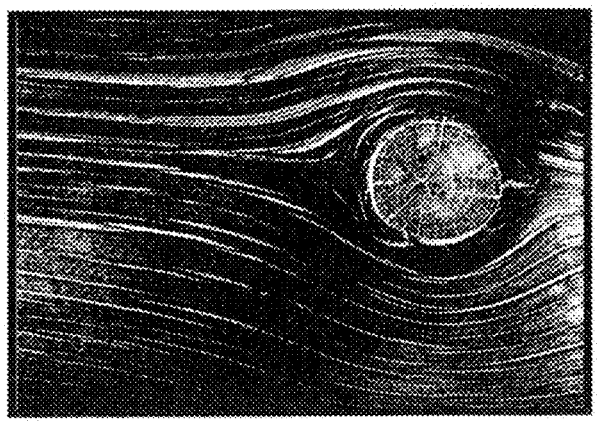
Figure 11C:
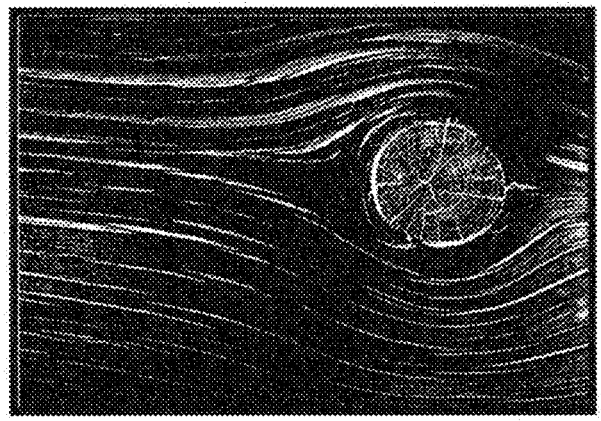
Figure 11D:
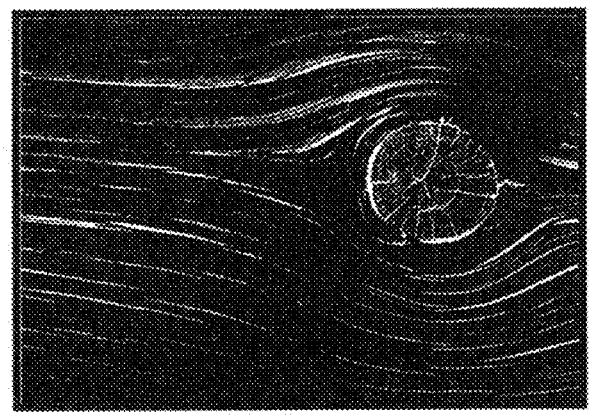

For example, when the grayscale image data shown in FIG. 4 is prepared in the image data generation step ST1, when the operator selects the first luminance value range R1 on the display 9, the image shown in FIG. 10A is displayed on the display 9, when the operator selects the second luminance value range R2 on the display 9, the image shown in FIG. 10B is displayed on the display 9, and when the operator selects the third luminance value range R3 on the display 9, the image shown in FIG. 10C is displayed on the display 9. Similarly, when the fourth luminance value range R4 is selected, the image shown in FIG. 10D is displayed on the display 9, when the fifth luminance value range R5 is selected, the image shown in FIG. 10E is displayed on the display 9, when the sixth luminance value range R6 is selected, the image shown in FIG. 10F is displayed on the display 9, when the seventh luminance value range R7 is selected, the image shown in FIG. 11A is displayed on the display 9, when the eighth luminance value range R8 is selected, the image shown in FIG. 11B is displayed on the display 9, when the ninth luminance value range R9 is selected, the image shown in FIG. 11C is displayed on the display 9, and when the tenth luminance value range R10 is selected, the image shown in FIG. 11D is displayed on the display 9.

Figure 12A:
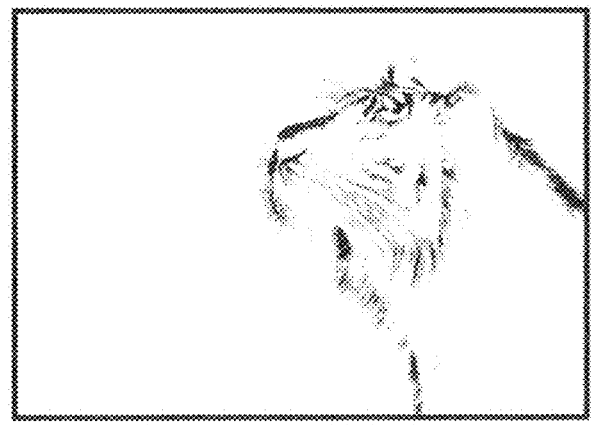
FIGS. 12A to 12F are diagrams showing an image displayed on the display in the image display step in the case of the grayscale image data shown in FIG. 5.
Figure 12B:
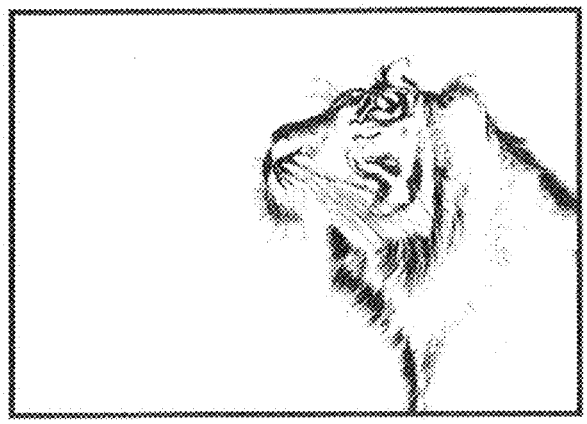
Figure 12C:
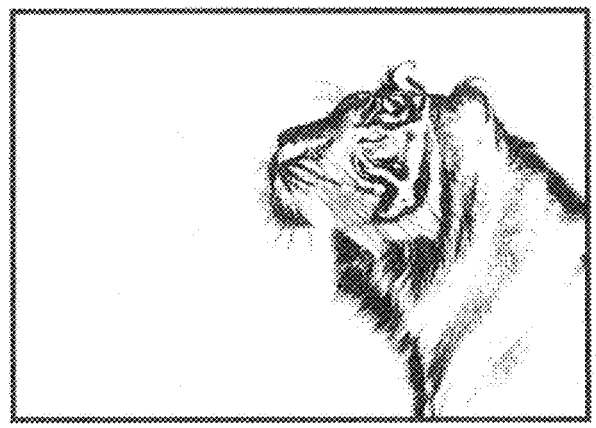
Figure 12D:
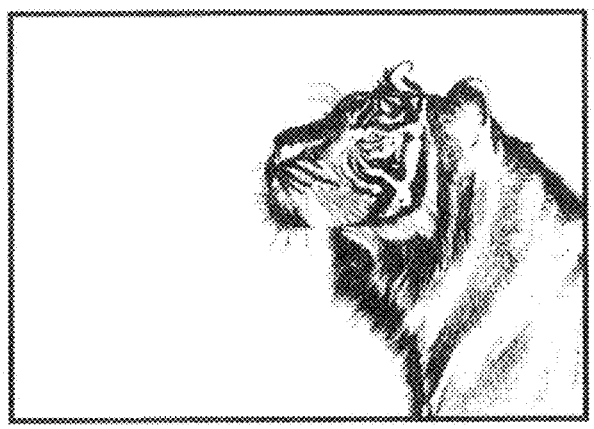
Figure 12E:
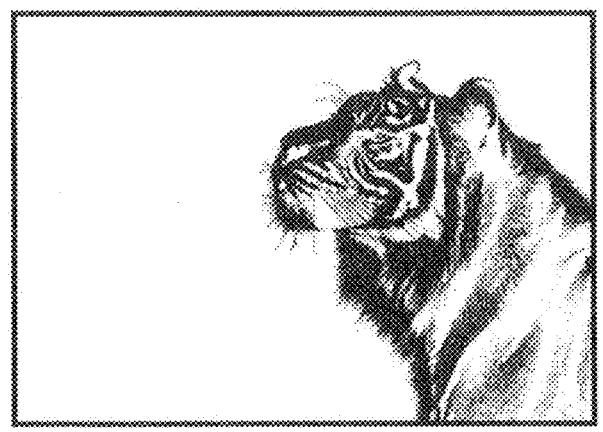
Figure 12F:
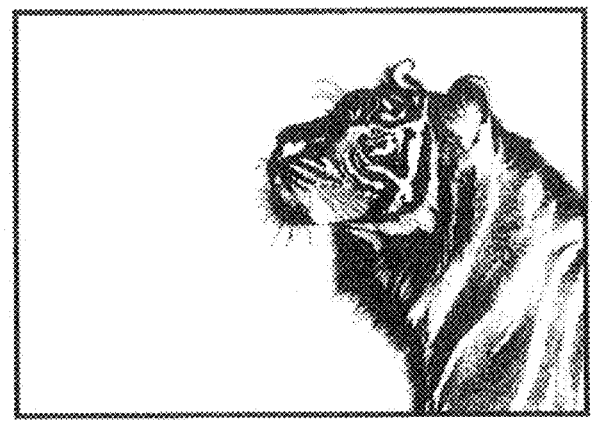
Figure 13A:
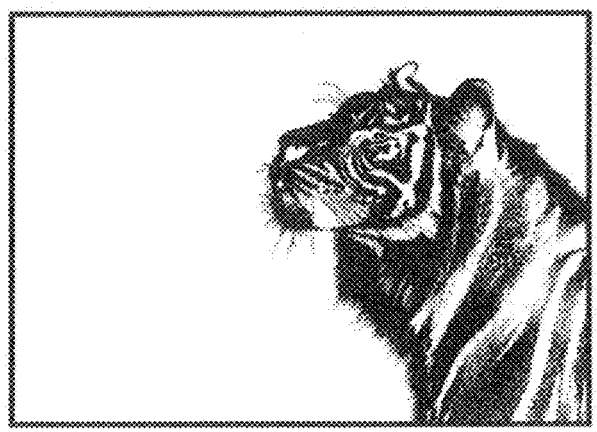
FIGS. 13A to 13D are diagrams showing an image displayed on the display in the image display step in the case of the grayscale image data shown in FIG. 5.
Figure 13B:
Figure 13C:
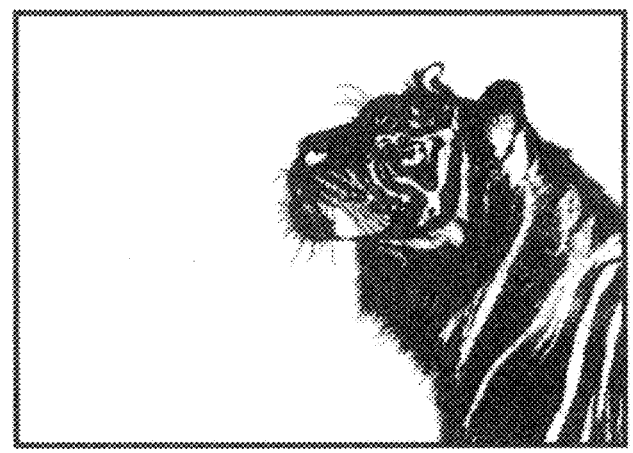
Figure 13D:

In addition, for example, when the grayscale image data shown in FIG. 5 is prepared in the image data generation step ST1, when the operator selects the first luminance value range R1 on the display 9, the image shown in FIG. 12A is displayed on the display 9, when the operator selects the second luminance value range R2 on the display 9, the image shown in FIG. 12B is displayed on the display 9, and when the operator selects the third luminance value range R3 on the display 9, the image shown in FIG. 12C is displayed on the display 9. Similarly, when the fourth luminance value range R4 is selected, the image shown in FIG. 12D is displayed on the display 9, when the fifth luminance value range R5 is selected, the image shown in FIG. 12E is displayed on the display 9, when the sixth luminance value range R6 is selected, the image shown in FIG. 12F is displayed on the display 9, when the seventh luminance value range R7 is selected, the image shown in FIG. 13A is displayed on the display 9, when the eighth luminance value range R8 is selected, the image shown in FIG. 13B is displayed on the display 9, when the ninth luminance value range R9 is selected, the image shown in FIG. 13C is displayed on the display 9, and when the tenth luminance value range R10 is selected, the image shown in FIG. 13D is displayed on the display 9.

Thereafter, the operator determines whether or not it is necessary to readjust the division position of the luminance value of 256 gradations of the histogram while checking the image corresponding to each ink layer displayed on the display 9 (step ST8). When readjustment of the division position of the luminance value of 256 gradations is unnecessary, the 10 luminance value ranges temporarily set in step ST5 are officially set as the 10 luminance value ranges (step ST9). In step ST9, when the operator performs a predetermined operation on the PC 5, 10 luminance value ranges are automatically officially set.

On the other hand, when it is necessary to readjust the division position of the luminance value of 256 gradations, the operator displays a histogram on the display 9 and readjusts the division position of the luminance value of 256 gradations (step ST10). In the present embodiment, since the division position of the luminance value of 256 gradations can be set to any position, the operator performs a predetermined operation on the PC 5 to readjust the division position of the luminance value of 256 gradations to any position. When the division position is readjusted in step ST10, the process returns to step ST5 to temporarily set 10 luminance value ranges.

Thus, in the present embodiment, in the luminance value range setting steps ST3 to ST10, the division position of the luminance value of 256 gradations is adjusted while the histogram displayed on the display 9 is checked. Specifically, the histogram displayed on the display 9 is checked, and when there is no histogram bias as in the histogram shown in FIG. 6, the luminance value of 256 gradations is equally divided into 10 (step ST4), and when there is a histogram bias as in the histogram shown in FIG. 7, the luminance value of 256 gradations is divided into 10 at the recommended position (step ST6). In addition, the division position of the luminance value of 256 gradations is readjusted as necessary (step ST10).

When 10 luminance value ranges are set in step ST9, the PC 5 prepares printing data and transmits the printing data to the printer 4, and the printer 4 performs printing on the print medium 2 (printing step ST11). In the printing step ST11, the printer 4 automatically performs printing on the print medium 2. In the printing step ST11, first, the color ink layer 3b is printed based on the color image data prepared in the image data generation step ST1. In addition, in the printing step ST11, the thickly-piled portion 3a is formed on the color ink layer 3b based on the 10 luminance value ranges set in step ST9. That is, in the printing step ST11, printing is performed on the print medium 2 based on the 10 luminance value ranges set in the luminance value range setting steps ST3 to ST10.

When the thickly-piled portion 3a is formed in the printing step ST11, printing is performed as described above. That is, when M is assumed to be a natural number of 10 or less as described above, when the thickly-piled portion 3a is formed in the printing step ST11, in the portion in which the luminance value is included in the M-th luminance value range from the first luminance value range R1 toward the tenth luminance value range R10 in the grayscale image data, the ink layers of (11-M) layers from the M-th printing of the ink layer to the tenth printing of the ink layer are printed, and in the portion in which the luminance value is 0 in the grayscale image data, no ink layer is printed.

For example, in the portion in which the luminance value is included in the first luminance value range R1 being the first luminance value range from the first luminance value range R1 toward the tenth luminance value range R10 in the grayscale image data, ink layers of 10 layers from the first printing of the ink layer to the tenth printing of the ink layer are printed. In addition, for example, in the portion in which the luminance value is included in the third luminance value range R3 being the third luminance value range from the first luminance value range R1 toward the tenth luminance value range R10 in the grayscale image data, ink layers of 8 layers from the third printing of the ink layer to the tenth printing of the ink layer are printed.

In addition, when the thickly-piled portion 3a is formed in the printing step ST11, in the portion in which the luminance value is included in the first luminance value range R1 in the grayscale image data, ink layers of 10 layers are sequentially stacked, in the portion in which the luminance value is included in the second luminance value range R2 in the grayscale image data, ink layers of 9 layers are sequentially stacked, in the portion in which the luminance value is included in the third luminance value range R3 in the grayscale image data, ink layers of 8 layers are sequentially stacked, in the portion in which the luminance value is included in the fourth luminance value range R4 in the grayscale image data, ink layers of 7 layers are sequentially stacked, in the portion in which the luminance value is included in the fifth luminance value range R5 in the grayscale image data, ink layers of 6 layers are sequentially stacked, in the portion in which the luminance value is included in the sixth luminance value range R6 in the grayscale image data, ink layers of 5 layers are sequentially stacked, in the portion in which the luminance value is included in the seventh luminance value range R7 in the grayscale image data, ink layers of 4 layers are sequentially stacked, in the portion in which the luminance value is included in the eighth luminance value range R8 in the grayscale image data, ink layers of 3 layers are sequentially stacked, in the portion in which the luminance value is included in the ninth luminance value range R9 in the grayscale image data, ink layers of 2 layers are sequentially stacked, and in the portion in which the luminance value is included in the tenth luminance value range R10 in the grayscale image data, an ink layer of 1 layer is printed (see hatched portions in FIGS. 8B and 9B).

In addition, when the grayscale image data shown in FIG. 4 is prepared in the image data generation step ST1, and when the thickly-piled portion 3a is formed based on the luminance value range shown in FIG. 6, when the thickly-piled portion 3a is formed in the printing step ST11, the ink layer corresponding to the image shown in FIG. 10A is printed at the first printing of the ink layer, the ink layer corresponding to the image shown in FIG. 10B is printed at the second printing of the ink layer, the ink layer corresponding to the image shown in FIG. 10C is printed at the third printing of the ink layer, the ink layer corresponding to the image shown in FIG. 10D is printed at the fourth printing of the ink layer, the ink layer corresponding to the image shown in FIG. 10E is printed at the fifth printing of the ink layer, the ink layer corresponding to the image shown in FIG. 10F is printed at the sixth printing of the ink layer, the ink layer corresponding to the image shown in FIG. 11A is printed at the seventh printing of the ink layer, the ink layer corresponding to the image shown in FIG. 11B is printed at the eighth printing of the ink layer, the ink layer corresponding to the image shown in FIG. 11C is printed at the ninth printing of the ink layer, and the ink layer corresponding to the image shown in FIG. 11D is printed at the tenth printing of the ink layer.

In addition, when the grayscale image data shown in FIG. 5 is prepared in the image data generation step ST1, and when the thickly-piled portion 3a is formed based on the luminance value range shown in FIG. 7, when the thickly-piled portion 3a is formed in the printing step ST11, the ink layer corresponding to the image shown in FIG. 12A is printed at the first printing of the ink layer, the ink layer corresponding to the image shown in FIG. 12B is printed at the second printing of the ink layer, the ink layer corresponding to the image shown in FIG. 12C is printed at the third printing of the ink layer, the ink layer corresponding to the image shown in FIG. 12D is printed at the fourth printing of the ink layer, the ink layer corresponding to the image shown in FIG. 12E is printed at the fifth printing of the ink layer, the ink layer corresponding to the image shown in FIG. 12F is printed at the sixth printing of the ink layer, the ink layer corresponding to the image shown in FIG. 13A is printed at the seventh printing of the ink layer, the ink layer corresponding to the image shown in FIG. 13B is printed at the eighth printing of the ink layer, the ink layer corresponding to the image shown in FIG. 13 C is printed at the ninth printing of the ink layer, and the ink layer corresponding to the image shown in FIG. 13D is printed at the tenth printing of the ink layer.

(Main Effects of the Present Embodiment)

As described above, in the present embodiment, in the luminance value range setting steps ST3 to ST10, the division position of the luminance value of 256 gradations is adjusted while the histogram displayed on the display 9 is checked. Therefore, in the present embodiment, regardless of whether there is no histogram bias as in the histogram shown in FIG. 6 or there is a histogram bias as in the histogram shown in FIG. 7, it is possible to set the division position of the luminance value of 256 gradations to be divided into 10 so as to make the unevenness of the surface of the uneven portion 3 clear.

Figure 18A:
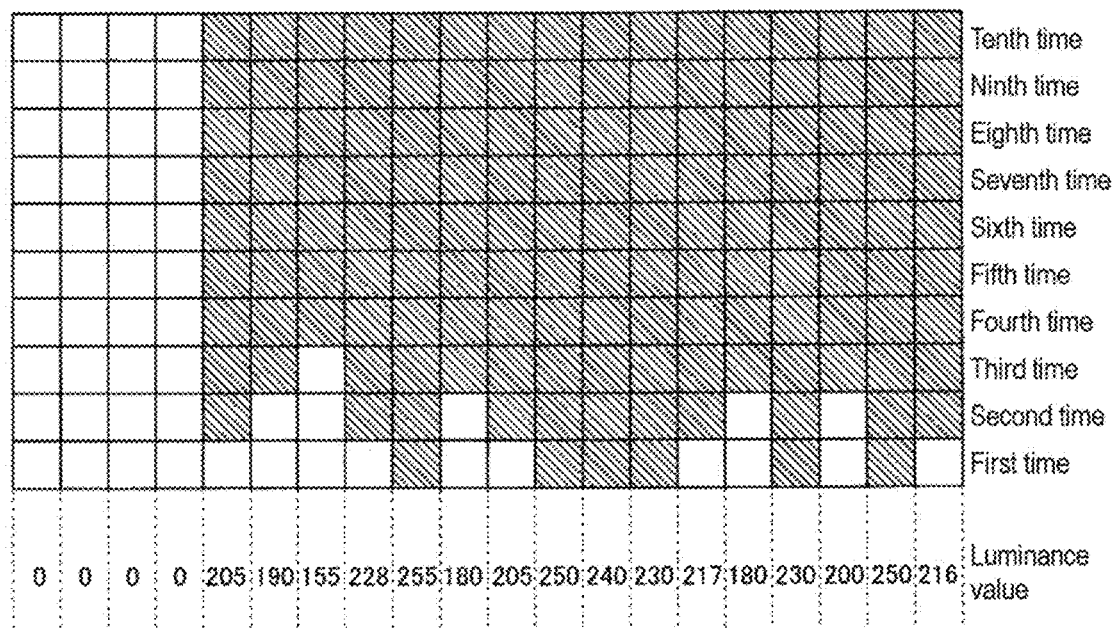
FIGS. 18A and 18B are diagrams for illustrating a problem to be solved by the present disclosure.
Figure 18B:
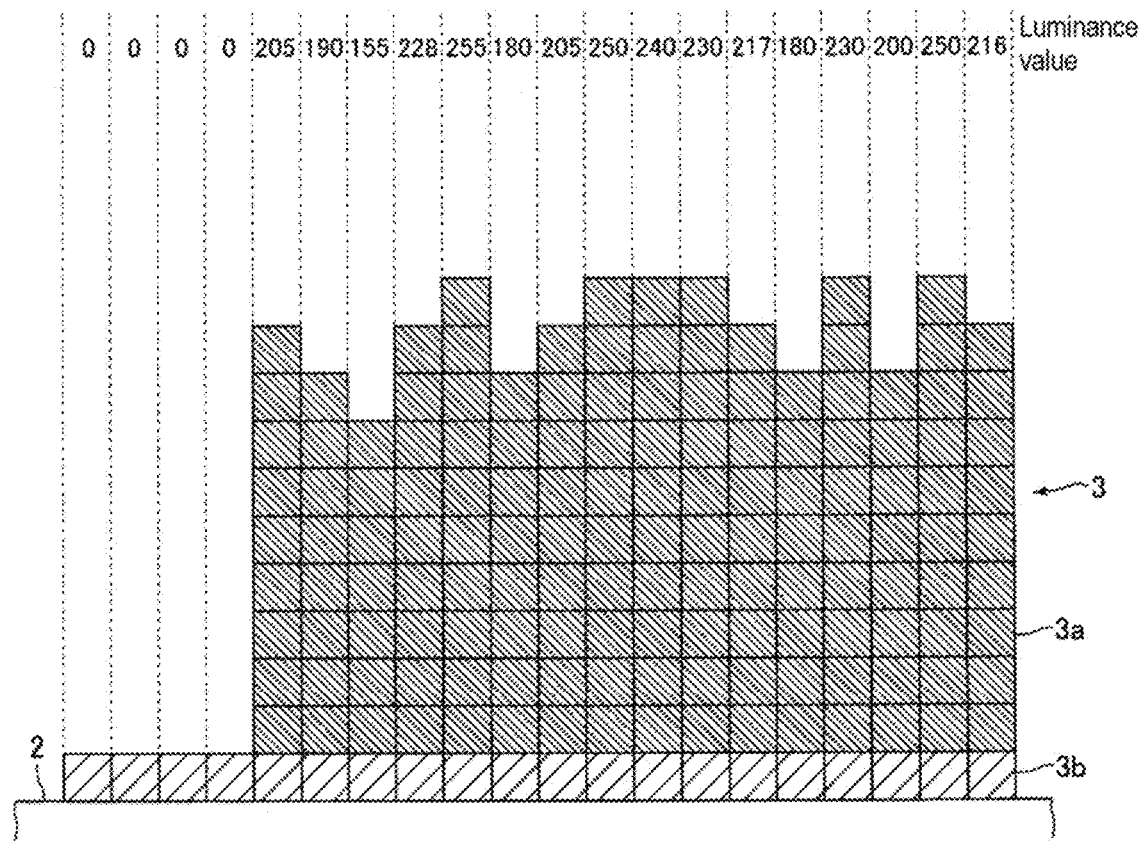

Therefore, in the present embodiment, regardless of whether there is a bias or there is no bias in the histogram of the luminance value of the grayscale image data, as shown in FIGS. 8B and 9B, it is possible to vary the number of stacking of the ink layers in the portion constituting the thickly-piled portion 3a, and as a result, it is possible to make the unevenness of the surface of the uneven portion 3 clear and express the unevenness feeling of the surface of the uneven portion 3. It should be noted that as apparent from a comparison between FIG. 9B and FIG. 18B, even if the uneven portion 3 is printed on the print medium 2 based on the same grayscale image data shown in FIG. 5, adjusting the division position of the luminance value of 256 grada-tions makes it possible to make the unevenness of the surface of the uneven portion 3 clear and express the unevenness feeling of the surface of the uneven portion 3.

In the present embodiment, when 10 luminance value ranges are temporarily set in step ST5, it is possible to display, on the display 9, images corresponding to some of 10 times of ink layers or images corresponding to all of 10 times of ink layers from the image corresponding to the ink layer to be printed for the first time in the thickly-piled portion 3a to the image corresponding to the ink layer to be printed for the tenth time in the thickly-piled portion 3a. Therefore, in the present embodiment, it is possible to check the image corresponding to the ink layer of each number of times of printing on the display 9, and readjust the division position of the luminance value of 256 gradations. Therefore, in the present embodiment, it is possible to set the division position of the luminance value of 256 gradations to be divided into 10 so that the unevenness of the surface of the uneven portion 3 can be made clearer.

In the present embodiment, in step ST10, the division position of the luminance value of 256 gradations can be set to any position. Therefore, in the present embodiment, it is possible to set the division position of the luminance value of 256 gradations to be divided into 10 so that the unevenness of the surface of the uneven portion 3 can be made clearer.

(Modification of Uneven Portion)

Figure 14:
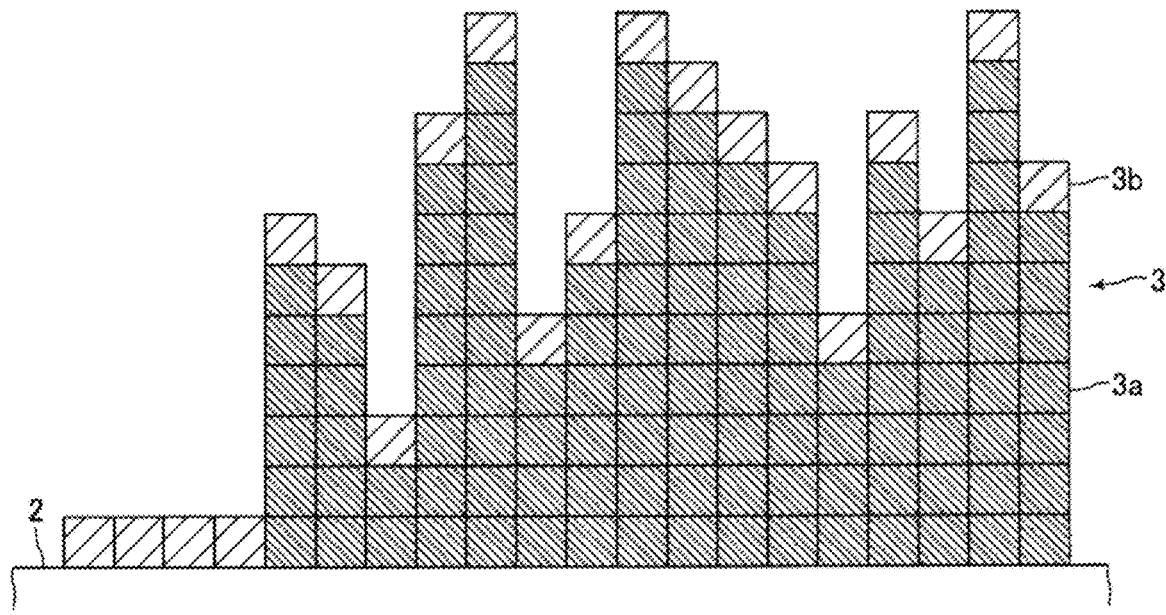
FIG. 14 is a diagram for illustrating a configuration of the uneven portion according to another embodiment of the present disclosure.
Figure 15:
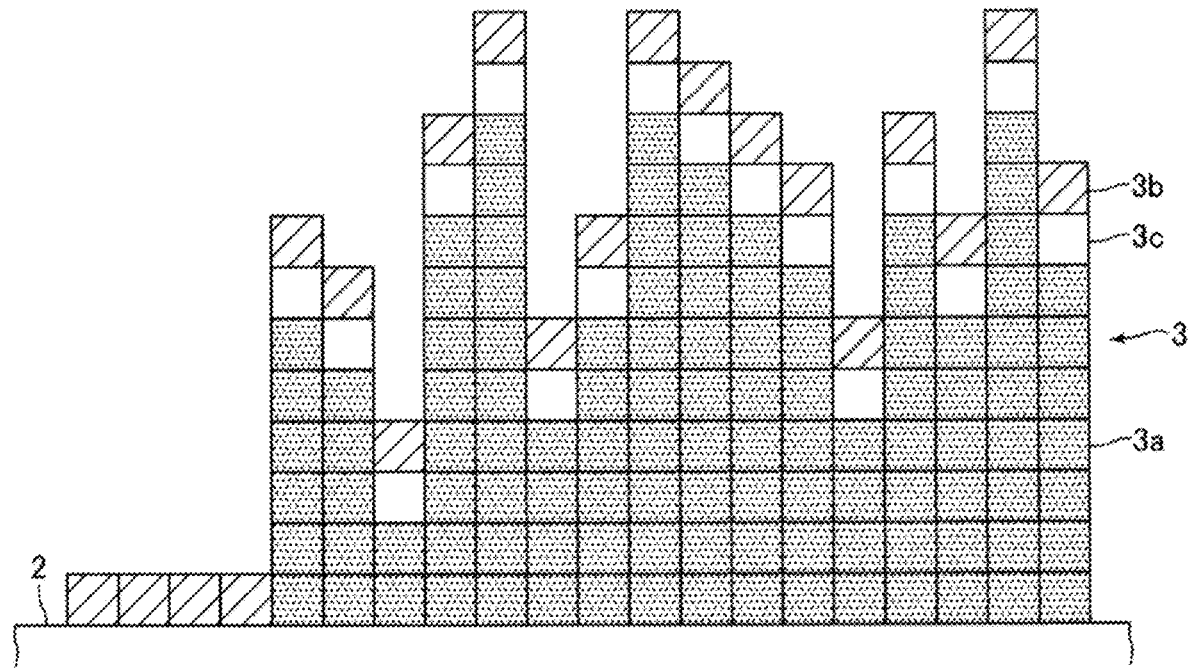
FIG. 15 is a diagram for illustrating a configuration of the uneven portion according to another embodiment of the present disclosure.

FIGS. 14 and 15 are diagrams for illustrating a configuration of the uneven portion 3 according to another embodiment of the present disclosure.

In the embodiment described above, as shown in FIG. 14, the uneven portion 3 may include a thickly-piled portion 3a made of a cured clear ink, and a color ink layer 3b to be stacked on the thickly-piled portion 3a. That is, in the embodiment described above, the color ink layer 3b may be formed on the thickly-piled portion 3a. It should be noted that in order to use the principle of subtractive color mixture, the print medium 2 is preferably white. When the print medium 2 is white, the color of the color ink layer 3b to be printed on the upper surface of the thickly-piled portion 3a made of the cured clear ink is recognized as the original color of the image data. In addition, when the print medium 2 is not white, it is also conceivable to perform printing in accordance with the color image data as appropriate using the white ink and then to print the thickly-piled portion 3a. In addition, in the embodiment described above, the uneven portion 3 may be composed only of the thickly-piled portion 3a.

In addition, in the modification shown in FIG. 14, the thickly-piled portion 3a may be formed of cured four color inks (CMYK). In this case, as shown in FIG. 15, a white ink layer 3c made of a cured white ink is formed between the thickly-piled portion 3a and the color ink layer 3b. That is, the uneven portion 3 may include the thickly-piled portion 3a, the color ink layer 3b, and the white ink layer 3c. The white ink layer 3c is composed of an ink layer of 1 layer. It should be noted that in the modification shown in FIG. 15, since the amount of ink constituting an ink layer of one layer in the thickly-piled portion 3a can be set to 4 times the amount in the embodiment described above, the thickness of the thickly-piled portion 3a can be increased as compared with that of the embodiment described above.

Other Embodiments

The above-described embodiment is an example of a preferred embodiment of the present disclosure, but is not limited thereto, and various modifications can be made within the scope of not changing the gist of the present disclosure.

In the embodiment described above, as in the histogram shown in FIG. 7, in a case where the range where the frequency increases is concentrated on one range where the luminance values are from 255 to 150, when 10 luminance value ranges are set, the range where the frequency increases (that is, the range of luminance values from 255 to 150) may be enlarged and displayed on the screen of the display 9. In this case, the division position of the luminance value of 256 gradations can be easily checked on the screen of the display 9.

Figure 16:
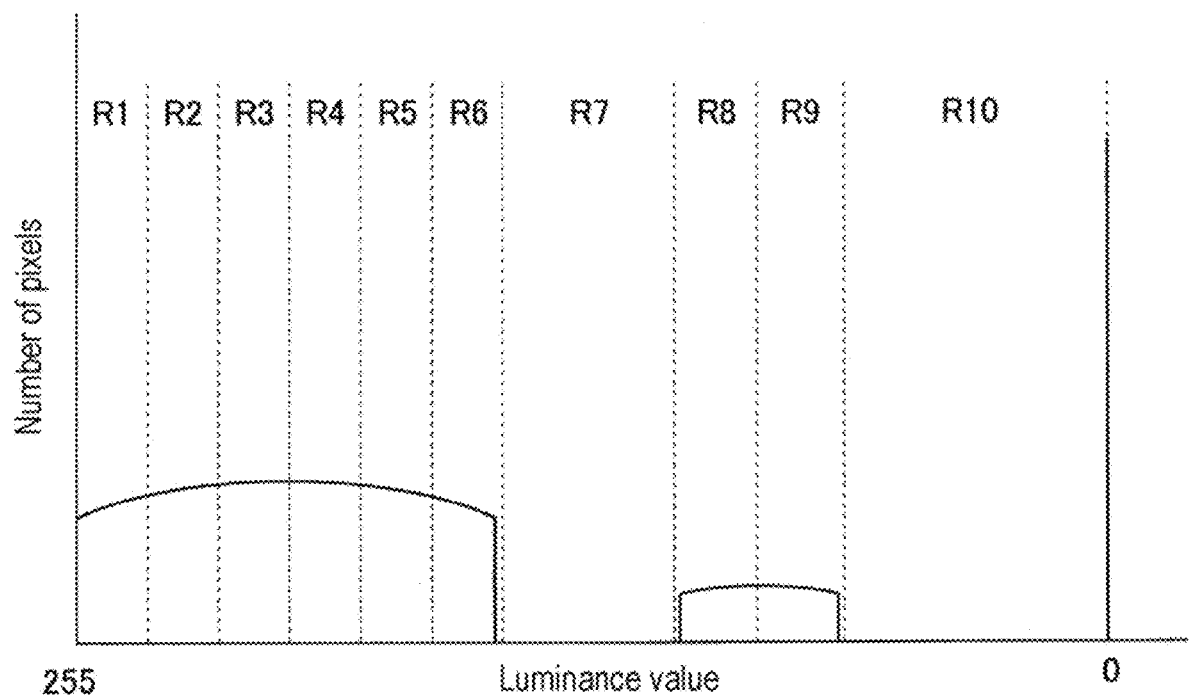
FIG. 16 is a histogram of luminance values of grayscale image data according to another embodiment of the present disclosure.
Figure 17:
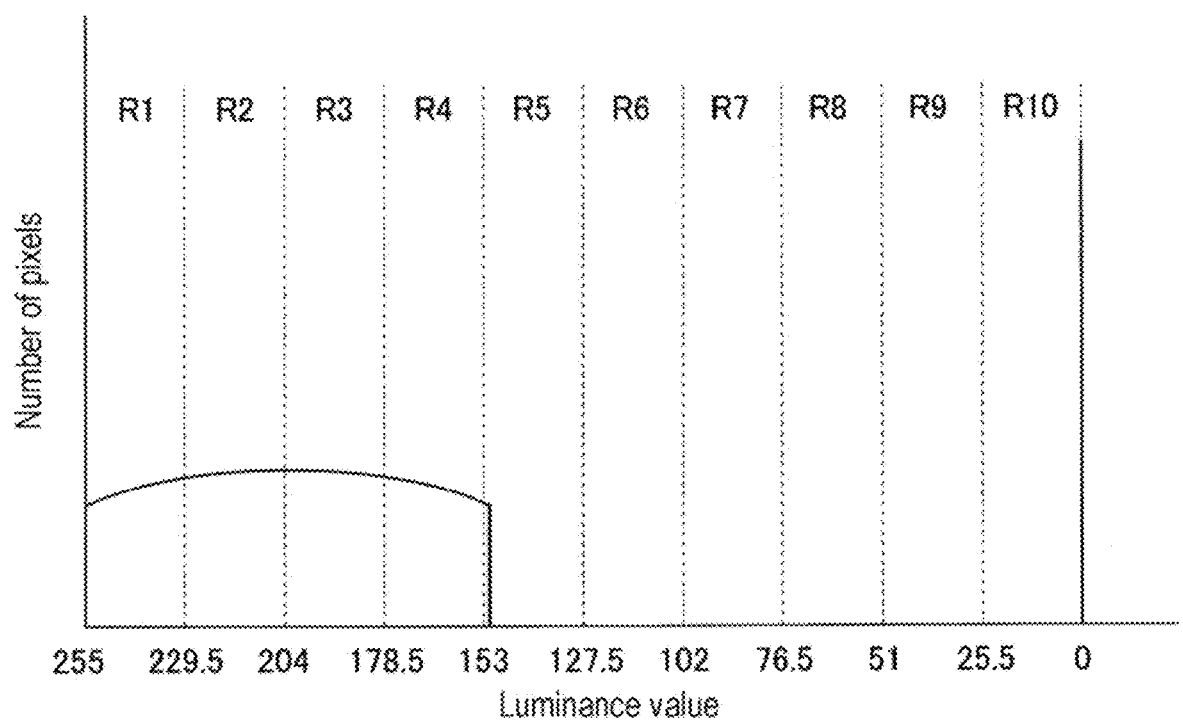
FIG. 17 is a diagram for illustrating a problem to be solved by the present disclosure.

In the histogram shown in FIG. 7 of the embodiment described above, there is one range where the frequency increases, which is the range of the luminance values from 255 to 150, but there may be two or more ranges where the frequency increases in the histogram of the luminance value of the grayscale image data prepared in the image data generation step ST1. For example, as shown in FIG. 16, in the histogram of the luminance values of the grayscale image data, there may be two ranges in which the frequency increases. In this case, in the luminance value range setting steps ST3 to ST10, for example, as shown in FIG. 16, each luminance value range from the first luminance value range R1 to the tenth luminance value range R10 is set.

In the embodiment described above, the luminance value of the darkest portion in the grayscale image data shown in FIGS. 4 and 5 is 255, but the luminance value of the darkest portion in the grayscale image data shown in FIGS. 4 and 5 may be 254 or less. For example, the luminance value of the darkest portion in the grayscale image data shown in FIGS. 4 and 5 may be 225. Even in this case, the first luminance value range R1 is set so that the luminance value 225 of the darkest portion in the grayscale image data shown in FIGS. 4 and 5 is included in the first luminance value range R1.

In the embodiment described above, instead of step ST6, a step in which the operator determines the division position of the luminance value of 256 gradations while checking the histogram displayed on the display 9 may be executed. In addition, in the embodiment described above, the number of gradations of the grayscale image data to be prepared in the image data generation step ST1 may be other than 256. In addition, in the embodiment described above, when the histogram prepared in the histogram preparation step ST2 has a curved shape having a plurality of local maximum values and local minimum values, for example, the luminance value of 256 gradations may be divided at the position of the local maximum value and the position of the local minimum value and a plurality of luminance value ranges may be set.

In the embodiment described above, the number of stacking of the ink layers in the thickest portion in the thickly-piled portion 3a may be 2 or more and 9 or less, or may be 11 or more. In this case, assuming that the number of stacking of the ink layers in the thickest portion in the thickly-piled portion 3a is N and M is a natural number of N or less, the luminance value of 256 gradations is divided into N in the luminance value setting steps ST3 to ST10. In addition, when the thickly-piled portion 3a is formed in the printing step ST11, in the portion where the luminance value is included in the M-th luminance value range from the maximum luminance value range being the luminance value range including the luminance value of 255 toward the minimum luminance value range being the luminance value range not including the luminance value of 0 but including the luminance value of 1 in the grayscale image data, printing of the ink layers of (N−M+1) layers from the M-th printing of the ink layer to the N-th printing of the ink layer is performed, and in the portion where the luminance value is 0 in the grayscale image data, no ink layer is printed.

In the embodiment described above, the luminance value of the darkest portion in the grayscale image data is the maximum (specifically, the luminance value of the darkest portion in the grayscale image data is 255), but the luminance value of the darkest portion in the grayscale image data may be the minimum. That is, the luminance value of the brightest portion in the grayscale image data may be the maximum. For example, the luminance value of the darkest portion in the grayscale image data may be 0, and the luminance value of the brightest portion in the grayscale image data may be 255.

In this case, the luminance value of 254 is included in the first luminance value range R1, but the luminance value of 255 is not included in the first luminance value range R1. In addition, in this case, the luminance value of 0 is included in the tenth luminance value range R10. In this case, the first luminance value range R1 is the maximum luminance value range being the luminance value range not including the maximum luminance value (that is, the luminance value of 255) being the maximum value in the luminance value of 256 gradations but including the luminance value (that is, the luminance value of 254) being the second largest after the maximum luminance value, and the tenth luminance value range R10 is the minimum luminance value range being the luminance value including the luminance value of 0.

In addition, in this case, the luminance value of the darkest portion in the grayscale image data is included in the tenth luminance value range R10. In addition, in this case, assuming that M is a natural number of 10 or less, when the thickly-piled portion 3a is formed in the printing step ST11, in the portion in which the luminance value is included in the M-th luminance value range from the tenth luminance value range R10 toward the first luminance value range R1 in the grayscale image data, the ink layers of (11-M) layers from the M-th printing of the ink layer to the tenth printing of the ink layer are printed, and in the portion in which the luminance value is 255 (that is, the portion having the maximum luminance value) in the grayscale image data, no ink layer is printed.

What is claimed is:

1. A print method for printing an uneven portion constituted by a plurality of stacked ink layers and having unevenness on a surface of the uneven portion on a print medium by an inkjet printer, the print method comprising:
when a portion that gives a thickness to the uneven portion in the uneven portion is a thickly-piled portion, a number of stacking of the ink layers of a thickest portion in the thickly-piled portion is N, and a natural number of N or less is M,
an image data preparation step of preparing a grayscale image data, being image data including the uneven portion and being image data representing a thickness of the thickly-piled portion with a grayscale of predetermined gradations;
a histogram preparation step of preparing a histogram of luminance values of the grayscale image data prepared in the image data preparation step;
a luminance value range setting step of dividing a luminance value of the predetermined gradations of the histogram prepared in the histogram preparation step into N and setting a range of N luminance values; and a printing step of performing printing on the print medium based on a luminance value range being a range of a luminance value set in the luminance value range setting step, wherein the image data preparation step, the histogram preparation step, the luminance value range setting step and the printing step are performed by a personal computer;

the printing step includes performing printing of the ink layer N times when the thickly-piled portion is formed, a luminance value of a darkest portion in the grayscale image data is maximum, the luminance value range including a maximum luminance value being a maximum value among luminance values of the predetermined gradations is set as a maximum luminance value range, and the luminance value range not including a luminance value of 0 but including a luminance value of 1 is set as a minimum luminance value range, a luminance value of a darkest portion in the grayscale image data is included in the maximum luminance value range, when the thickly-piled portion is formed in the printing step, in a portion in which a luminance value is included in the M-th luminance value range from the maximum luminance value range toward the minimum luminance value range in the grayscale image data, printing of the ink layers of (N−M+1) layers from an M-th printing of the ink layer to an N-th printing of the ink layer is performed, and in a portion in which a luminance value is 0 in the grayscale image data, printing of the ink layer is not performed, and the luminance value range setting step includes adjusting a division position of a luminance value of the predetermined gradations while checking the histogram displayed on a display that is predetermined.

2. The print method according to claim 1, wherein when a frequency in a specific range of the histogram increases, the luminance value range setting step includes increasing a number of divisions of a luminance value of the predetermined gradations in the specific range.

3. The print method according to claim 1, wherein the luminance value range setting step includes setting a division position of a luminance value of the predetermined gradations to any position.

4. The print method according to claim 1, wherein the luminance value range setting step includes displaying an image corresponding to the ink layer to be printed for an M-th time in the thickly-piled portion on the display.

5. The print method according to claim 1, wherein the thickly-piled portion is formed by stacking ink layers made of a cured clear ink, the uneven portion includes a color ink layer made of a cured color ink and the thickly-piled portion, and the thickly-piled portion is formed on the color ink layer, or the color ink layer is formed on the thickly-piled portion.

6. The print method according to claim 1, wherein the thickly-piled portion is formed by stacking ink layers made of a cured color ink, the uneven portion includes a color ink layer made of a cured color ink, a white ink layer made of a cured white ink, and the thickly-piled portion, and the white ink layer is formed on the thickly-piled portion, and the color ink layer is formed on the white ink layer.

7. A print method for printing an uneven portion constituted by a plurality of stacked ink layers and having unevenness on a surface of the uneven portion on a print medium by an inkjet printer, the print method comprising:

when a portion that gives a thickness to the uneven portion in the uneven portion is a thickly-piled portion, a number of stacking of the ink layers of a thickest portion in the thickly-piled portion is N, and a natural number of N or less is M, an image data preparation step of preparing a grayscale image data, being image data including the uneven portion and being image data representing a thickness of the thickly-piled portion with a grayscale of predetermined gradations;

a histogram preparation step of preparing a histogram of luminance values of the grayscale image data prepared in the image data preparation step;

a luminance value range setting step of dividing a luminance value of the predetermined gradations of the histogram prepared in the histogram preparation step into N and setting a range of N luminance values; and a printing step of performing printing on the print medium based on a luminance value range being a range of a luminance value set in the luminance value range setting step, wherein the image data preparation step, the histogram preparation step, the luminance value range setting step and the printing step are performed by a personal computer;

the printing step includes performing printing of the ink layer N times when the thickly-piled portion is formed, a luminance value of a darkest portion in the grayscale image data is minimum, the luminance value range not including a maximum luminance value being a maximum value among luminance values of the predetermined gradations but including a luminance value being a second largest after the maximum luminance value is set as a maximum luminance value range, and the luminance value range including a luminance value of 0 is set as a minimum luminance value range, a luminance value of a darkest portion in the grayscale image data is included in the minimum luminance value range, when the thickly-piled portion is formed in the printing step, in a portion in which a luminance value is included in the M-th luminance value range from the minimum luminance value range toward the maximum luminance value range in the grayscale image data, printing of the ink layers of (N−M+1) layers from an M-th printing of the ink layer to an N-th printing of the ink layer is performed, and in a portion in which a luminance value is the maximum luminance value in the grayscale image data, printing of the ink layer is not performed, and the luminance value range setting step includes adjusting a division position of a luminance value of the predetermined gradations while checking the histogram displayed on a display that is predetermined.

8. The print method according to claim 7, wherein when a frequency in a specific range of the histogram increases, the luminance value range setting step includes increasing a number of divisions of a luminance value of the predetermined gradations in the specific range.

9. The print method according to claim 7, wherein
the luminance value range setting step includes setting a division position of a luminance value of the predetermined gradations to any position.

10. The print method according to claim 7, wherein
the luminance value range setting step includes displaying an image corresponding to the ink layer to be printed for an M-th time in the thickly-piled portion on the display.

11. The print method according to claim 7, wherein
the thickly-piled portion is formed by stacking ink layers made of a cured clear ink,
the uneven portion includes a color ink layer made of a cured color ink and the thickly-piled portion, and
the thickly-piled portion is formed on the color ink layer, or the color ink layer is formed on the thickly-piled portion.

12. The print method according to claim 7, wherein
the thickly-piled portion is formed by stacking ink layers made of a cured color ink,
the uneven portion includes a color ink layer made of a cured color ink, a white ink layer made of a cured white ink, and the thickly-piled portion, and
the white ink layer is formed on the thickly-piled portion, and the color ink layer is formed on the white ink layer.

* * * * *